(12) United States Patent
Artieri et al.

(10) Patent No.: US 11,520,706 B2
(45) Date of Patent: Dec. 6, 2022

(54) DRAM-AWARE CACHING

(71) Applicant: QUALCOMM INCORPORATED, San Diego, CA (US)

(72) Inventors: Alain Artieri, San Diego, CA (US); Rakesh Kumar Gupta, San Diego, CA (US); Subbarao Palacharla, San Diego, CA (US); Kedar Bhole, San Diego, CA (US); Laurent Rene Moll, San Jose, CA (US); Carlo Spitale, San Diego, CA (US); Sparsh Singhai, San Diego, CA (US); Shyamkumar Thoziyoor, Sand Diego, CA (US); Gopi Tummala, Sunnyvale, CA (US); Christophe Avoinne, Campbell, CA (US); Samir Ginde, San Diego, CA (US); Syed Minhaj Hassan, San Diego, CA (US); Jean-Jacques Lecler, Antibes (FR); Luigi Vinci, Cork (IE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/244,398

(22) Filed: Apr. 29, 2021

(65) Prior Publication Data
US 2022/0350749 A1    Nov. 3, 2022

(51) Int. Cl.
*G06F 12/00* (2006.01)
*G06F 12/0893* (2016.01)
*G06F 12/12* (2016.01)

(52) U.S. Cl.
CPC .......... *G06F 12/0893* (2013.01); *G06F 12/12* (2013.01); *G06F 2212/1041* (2013.01)

(58) Field of Classification Search
CPC ................ G06F 12/0893; G06F 12/12; G06F 2212/1041
See application file for complete search history.

(56) References Cited

U.S. PATENT DOCUMENTS

| | | | | |
|---|---|---|---|---|
| 6,535,512 | B1* | 3/2003 | Daniel | H04L 12/5601 370/395.1 |
| 2003/0084248 | A1* | 5/2003 | Gaither | G06F 12/0804 711/E12.04 |
| 2006/0026342 | A1* | 2/2006 | Calvignac | G06F 13/1642 711/167 |
| 2010/0235579 | A1* | 9/2010 | Biles | G06F 12/127 711/E12.001 |
| 2013/0124802 | A1 | 5/2013 | Glasco et al. | |
| 2013/0297906 | A1 | 11/2013 | Loh et al. | |
| 2018/0018133 | A1 | 1/2018 | Balakrishnan | |
| 2018/0173429 | A1* | 6/2018 | Bonanno | G06F 3/0659 |
| 2019/0034351 | A1* | 1/2019 | Hermesh | G06F 9/5016 |

OTHER PUBLICATIONS

International Search Report and Written Opinion—PCT/US2022/020268—ISA/EPO—dated Jul. 14, 2022.

* cited by examiner

*Primary Examiner* — Gurtej Bansal
(74) *Attorney, Agent, or Firm* — Smith Tempel Blaha LLC/Qualcomm

(57) ABSTRACT

Data caching may include storing data associated with DRAM transaction requests in data storage structures organized in a manner corresponding to the DRAM bank, bank group and rank organization. Data may be selected for transfer to the DRAM by selecting among the data storage structures.

23 Claims, 16 Drawing Sheets

DRAM-AWARE CACHING

DESCRIPTION OF THE RELATED ART

A computing device may include multiple subsystems that communicate with one another via buses or other interconnects. Such a computing device may be, for example, a portable computing device ("PCD"), such as a laptop or palmtop computer, a cellular telephone or smartphone, portable digital assistant, portable game console, etc. The communicating subsystems may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" that provides wireless connectivity, a main or system memory, one or more cache memories, etc. Some subsystems may include processing engines that may perform memory transactions with the system memory. The system memory in PCDs and other computing devices commonly comprises dynamic random access memory ("DRAM").

DRAM is organized in arrays of rows and columns. A row must be opened before its data can be accessed. Only one row in an array may be open at any time. To help reduce latency, a DRAM may be organized in multiple banks, each comprising an array of the aforementioned type. A DRAM controller may initiate access to one bank while waiting for a previous access to another bank to complete. To provide further performance advantages, the banks may be organized in multiple bank groups. In addition, a DRAM may be organized in multiple ranks, each having multiple bank groups.

One task of the DRAM controller is to schedule or direct transactions among the ranks, bank groups and banks. The term "DRAM-aware" scheduling is sometimes used to describe how a DRAM controller may perform such scheduling in a manner that leverages the efficiencies afforded by the organization of the DRAM. For example, a DRAM controller may randomize its selection of a bank to access so that there is a low likelihood of sequential accesses being directed to different rows of the same bank. Also, for example, a DRAM controller may direct as many accesses as possible to one rank before switching to another rank because switching ranks incurs a high latency penalty.

A cache memory system may be interposed in the memory transaction path between the processing engine requesting the transaction and the DRAM controller. As the cache memory fills or becomes "dirty," the cache memory controller writes back or "evicts" some of the dirty cache lines to the DRAM to free up space in the cache memory. The DRAM-aware scheduling techniques employed by the DRAM controller may be insufficient to maximize efficiency in some circumstances.

SUMMARY OF THE DISCLOSURE

Systems, methods, computer-readable media, and other examples are disclosed for controlling data caching in a DRAM-aware manner.

An exemplary system for controlling data caching may include a plurality of data storage structures collectively having an organization corresponding to a structural organization of a DRAM. The exemplary system may further include a cache controller system. The cache controller system may be configured to receive a plurality of transaction requests. The cache controller system may further be configured to store data associated with the transaction requests in one or more data storage structures selected from among the plurality of data storage structures based on a memory address associated with each transaction request. The cache controller system may also be configured to control data transfer to the DRAM using the plurality of data storage structures.

An exemplary method for controlling data caching may include receiving a plurality of transaction requests. The exemplary method may further include storing data associated with the transaction requests in one or more data storage structures selected from among the plurality of data storage structures based on a memory address associated with each transaction request. The exemplary method may also include controlling data transfer to a DRAM using the plurality of data storage structures. The plurality of data storage structures may collectively have an organization corresponding to a structural organization of the DRAM.

Another exemplary system for controlling data caching may include means for receiving a plurality of transaction requests. The exemplary system may further include means for storing data associated with the transaction requests in one or more data storage structures selected from among the plurality of data storage structures based on a memory address associated with each transaction request. The exemplary system may also include means for controlling data transfer to a DRAM using the plurality of data storage structures. The plurality of data storage structures may collectively have an organization corresponding to a structural organization of the DRAM.

An exemplary computer-readable medium for controlling data caching may include a non-transitory computer-readable medium having instructions stored thereon in computer-executable form. The instructions, when executed by a processor, may configure the processor to receive a plurality of transaction requests. The instructions may further configure the processor to store data associated with the transaction requests in one or more data storage structures selected from among the plurality of data storage structures based on a memory address associated with each transaction request. The instructions may also configure the processor to control data transfer to a DRAM using the plurality of data storage structures.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
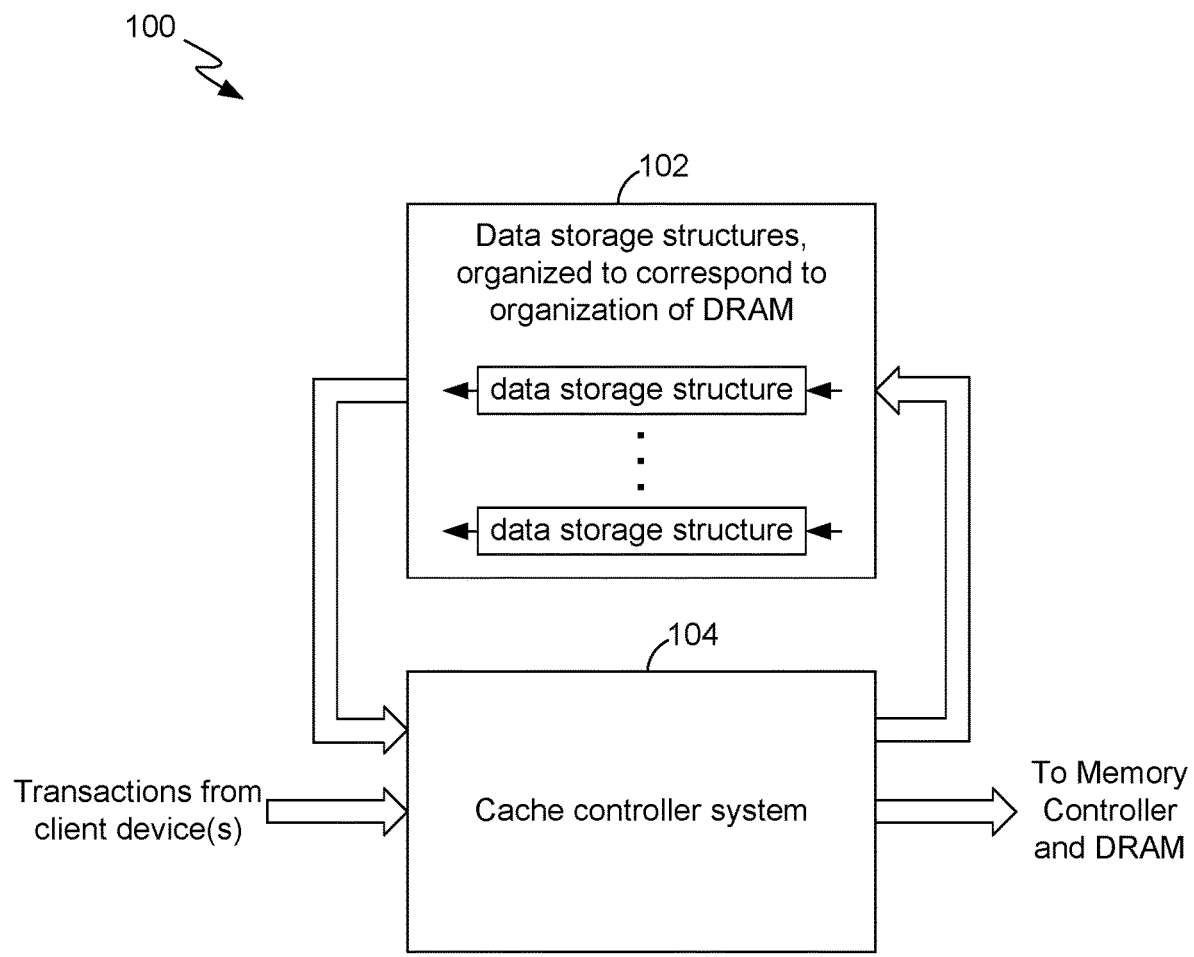
FIG. 1 is a block diagram illustrating a system for controlling data caching in a DRAM-aware manner, in accordance with exemplary embodiments.

As illustrated in FIG. 1, a system 100 for controlling aspects of data caching may be provided. The system 100 may be configured for controlling aspects of caching data relating to memory transactions between a client device (not shown) and a DRAM (not shown). Although in the exemplary embodiments described herein write transactions serve as examples of memory transactions, aspects of the systems, methods and other embodiments described herein may also be applicable to other types of transactions. The system 100 may include a plurality of data storage structures 102. The plurality of data storage structures 102 may collectively have an organization corresponding to an organization of the DRAM. For example, as described below, a DRAM may be organized in banks, bank groups, ranks, etc. The plurality of data storage structures 102 may have an organization corresponding to one or more of: a bank organization of the DRAM, a bank group organization of the DRAM, a rank organization of the DRAM, etc.

The system 100 may further include a cache controller system 104. The cache controller system 104 may be configured to receive DRAM transaction requests from one or more client devices (not shown). A client device may be of any type capable of initiating bus transactions, such as, for example, a CPU or other processor. Transaction requests may include read transaction requests and write transaction requests (which may also be referred to herein for brevity as read requests and write requests). The arrows in FIG. 1 indicate logical flows relating to transactions, and more specifically, indicate logical flows relating to the request-related aspects of transactions; response-related aspects, such as aspects relating to the return flow of data in response to a request, are not indicated by the arrows in FIG. 1 for purposes of clarity. It should also be understood that the arrows in FIG. 1 indicate logical flows in a conceptual manner, and are not intended to indicate specific physical interconnections, such as specific signal lines, buses, etc. Further, references in this disclosure to an "indication" may be broadly interpreted to include any type or combination of signals, bits, commands, instructions, etc.

A transaction request may include a target memory (i.e., DRAM) address and may also include other information as described below. The cache controller system 104 may further be configured to store data associated with the transaction request in a selected one of the data storage structures 102. The data storage structure 102 in which the data is stored may be selected from among the data storage structures 102 based on, among other information, the target memory address associated with the transaction request. For example, in the case of a write request, the information or data stored in the selected data structure 102 may be a form of cache address. As described below, such a cache address may indicate a location in a payload cache (not shown in FIG. 1) in which the data that is the subject of the write request is cached.

The cache controller system 104 may further be configured to control a transfer of data to the DRAM using the data storage structures 102. For example, as described below, data that is stored in the data storage structures 102 may be used to indicate locations or addresses of cached data to evict to the DRAM. The cache controller system 104 may be configured to control the transfer of data by selecting among the data storage structures 102 based on a sequence. The sequence may be based on, for example, a round-robin selection among the data storage structures 102. The sequence may be based on, for example, selecting between a first subset of the data storage structures 102 associated with a first rank of the DRAM and a second subset of the data storage structures 102 associated with a second rank of the DRAM. The sequence may be based on, for example, whether entries in the data storage structures indicate DRAM page hits. These aspects relating to selecting among the data storage structures 102 are further described below.

Figure 2:
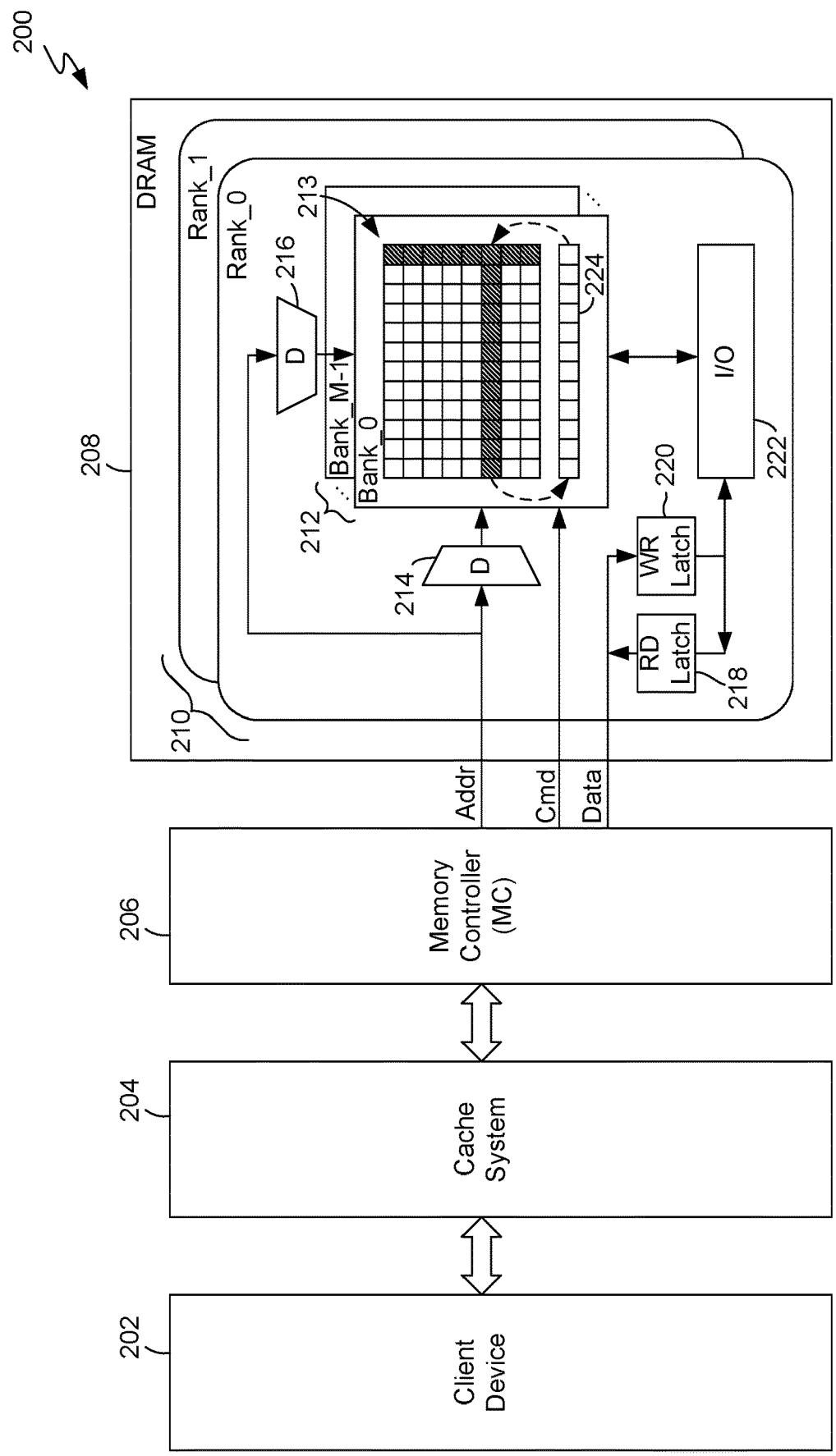
FIG. 2 is a block diagram of a memory system including a system for controlling data caching in a DRAM-aware manner, in accordance with exemplary embodiments.

As illustrated in FIG. 2, a system 200 may include a client device 202 (i.e., a processor or other processing engine), a cache system 204, a memory controller 206, and a DRAM 208. The client device 202 may issue DRAM transaction requests that may include read requests, i.e., requests to read data from the DRAM 208, and write requests, i.e., requests to store data in the DRAM 208. The DRAM transaction requests may also be referred to as requests to access the DRAM 208. Each DRAM transaction request may include a target address in the DRAM 208, a size or amount of data to be accessed, and other information. A write request also includes the data, which may be referred to as a payload, that the memory controller 206 is to store in the DRAM 208 in response to the write request.

The cache system 204 may include the features and operate in the manner of the above-described system 100 (FIG. 1). The cache system 204 may also include conventional features. For example, in some respects the cache system 204 may operate in the manner of a conventional write-back cache, which is well understood be one of ordinary skill in the art. For example, the cache system 204 may temporarily store or "cache" data requested to be written to the DRAM 208 responsive to a write request or data that has been read from the DRAM 208 responsive to a read request. As understood by one of ordinary skill in the art, data that has been stored in the cache system 204 but not yet written to the DRAM 208 is commonly referred to as "dirty" data. Conventionally, dirty data is periodically written to the DRAM 208, a process commonly referred to as eviction or cleaning. The eviction-related methods described herein may be included instead of, or in addition to, conventional eviction methods. Cleaning a cache also may be referred to colloquially as "scrubbing." Although not separately shown for purposes of clarity, the cache system 204 may include one or more processors (configurable by software or firmware) or other logic configurable to operate in the manner described herein, including in accordance with the methods described below.

The memory controller 206 may have a conventional structure and operate in a conventional manner. For example, the memory controller 206 may, among other functions, translate the transaction requests into DRAM commands and physical DRAM addresses. As the memory controller 206 and the manner in which it operates are well understood by one of ordinary skill in the art, such aspects of the memory controller 206 are not described herein.

The DRAM 208 may have a conventional structure and operate in a conventional manner. The DRAM 208 may be of any type not inconsistent with the descriptions herein. For example, the DRAM 208 may be a double data rate synchronous DRAM ("DDR-SDRAM"), sometimes referred to for brevity as "DDR." As DDR technology has evolved, DDR versions such as fourth generation low-power DDR ("LPDDR4") and fifth generation low-power DDR ("LPDDR5") have been developed. The DRAM 208 may be, for example, LPDDR4, LPDDR4X, LPDDR5, LPDDR5X, etc. Although the structure and operation of the DRAM 208 are well understood by one of ordinary skill in the art, the following brief description is provided as background.

The DRAM 208 may comprise two ranks 210, which may be referred to as Rank_0 and Rank_1. As the two ranks 210 are identical to each other, the following description applies to each rank 210. The rank 210 comprises two or more ("M") banks 212, which may be referred to as Bank_0 through Bank_M−1. Each bank 212 is organized as a two-dimensional array 213 of cells or storage locations, where the storage locations in the array 213 are accessed by selecting rows and columns. An exemplary row and an exemplary column are highlighted in cross-hatch in FIG. 2 for purposes of illustration. Also, although not illustrated in FIG. 2 for purposes of clarity, the DRAM 208 may further be organized in bank groups. For example, each rank 210 may consist of four bank groups (not shown), and each of those bank groups may consist of four banks. In such an embodiment the DRAM 208 therefore consists of 32 distinct (i.e., individually addressable) banks 212. Although in the exemplary embodiment described herein the DRAM 208 has two ranks 210, each having four bank groups, and each of the four bank groups has four banks 212, in other embodiments such a DRAM may be organized in any other way, including more or fewer ranks, banks, bank groups, etc., than in the exemplary embodiment.

The physical addresses by which the memory controller 206 accesses the DRAM 208 may include row addresses, column addresses, bank group addresses, and bank addresses. Also, although not shown for purposes of clarity, in response to a rank address (e.g., a chip select bit included in the read or write command) provided by the memory controller 206, rank address decoding logic may select one of the ranks 210. Although likewise not shown for purposes of clarity, in response to a bank address provided by the memory controller 206, bank address decoding logic may select one of the banks 212 in a selected bank group of a selected rank 210. In response to a row address provided by the memory controller 206, a row address decoder 214 may select one of the rows in a selected bank 212 of a selected bank group in a selected rank 210. Similarly, in response to a column address provided by the memory controller 206, a column address decoder 216 may select one of the columns in a selected bank 212 of a selected bank group in a selected rank 210.

Each rank 210 may have a read latch 218 to buffer the read data, and a write latch 220 to buffer the write data. Each rank 210 may also have input/output ("I/O") logic 222 configured to direct the read and write data from and to selected memory locations.

Each bank 212 may have a row buffer 224. The row buffer 224 stores the contents of the selected row (also referred to as a "page"). A row must be selected or "opened" before it may be written to or read from. Once a row is opened, the DRAM 208 may read from or write to any number of columns in the row buffer 224 in response to read or write commands. Following a read or write command, the data is transferred serially between the memory controller 206 and DRAM 208 in units known as a "burst," which may be, for example, eight bits per data signal line. The row must be restored or "closed" after writing to or reading from the row buffer 224.

A read or write transaction to a row that is already open is referred to as a "page hit." A read or write transaction to a row that is not open (and therefore needs to be opened) is referred to as a "page miss." A page miss incurs greater latency than a page hit. Performing a number of sequential transactions to the same open row (i.e., sequential page hits) rather than having to close one row and open another row is desirable, as it reduces latency. Also, sequential transactions directed to the same bank incur more latency than sequential transactions to different banks. The structure or organization of the DRAM 208 in bank groups and banks enables the DRAM controller 206 to initiate access to a row in one bank while waiting for a previous access to a row in another bank to complete. Such timing overlap helps minimize transaction latency. The DRAM controller 206 may employ a conventional bank hashing algorithm to help randomize its selection of a bank to access so that there is a low likelihood of sequential accesses being directed to the same bank. This randomization effect is commonly referred to as increasing bank and/or bank group "spread." The DRAM controller 206 may employ other algorithms to attempt to reduce other sources of latency, such as read-to-write switching, write-to-read switching, or rank-to-rank switching. The cache system 204 may include features, described below, which may further increase bank spread, increase page hit rate, and decrease read-to-write, write-to-read, or rank-to-rank switching, with a goal of further reducing latency.

Figure 3:
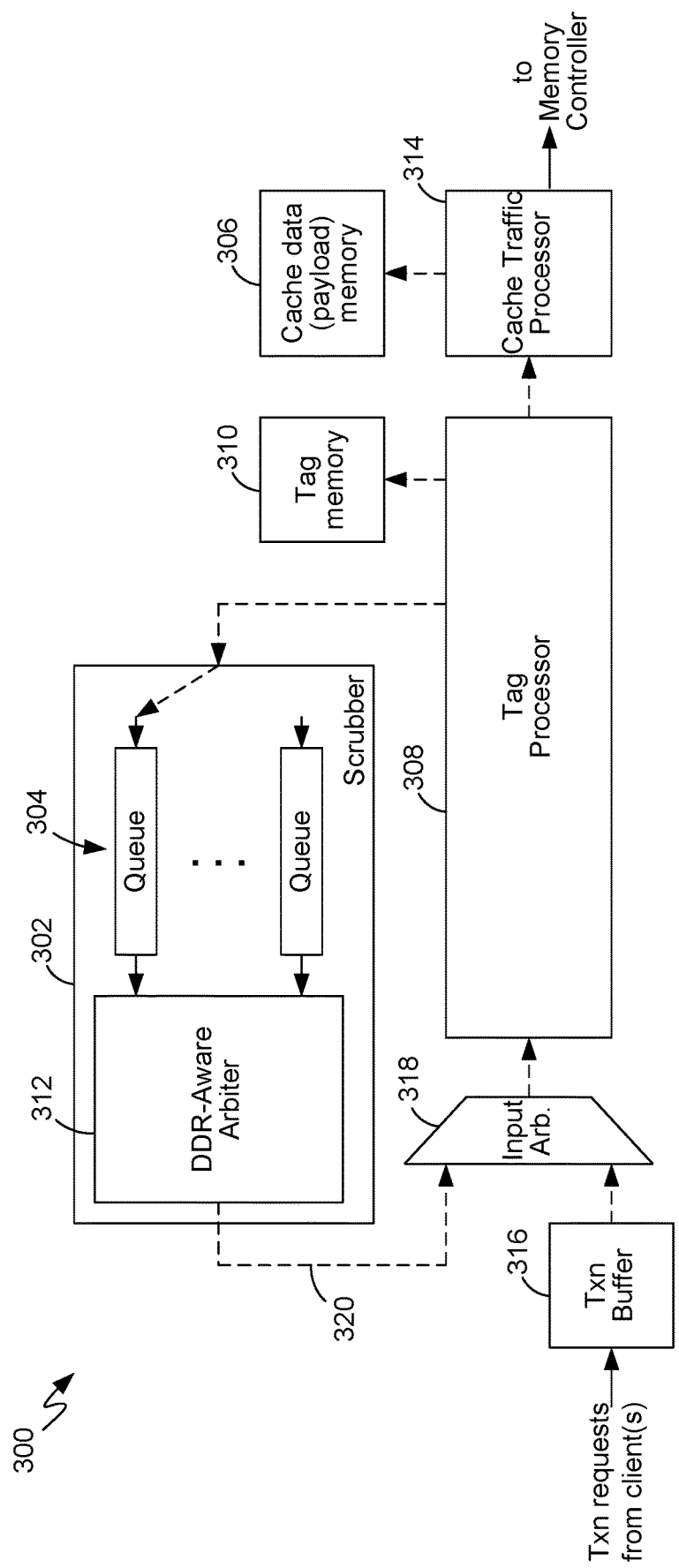
FIG. 3 is a block diagram of a system for controlling data caching in a DRAM-aware manner, in accordance with exemplary embodiments.

As illustrated in FIG. 3, a system 300 for controlling aspects of data caching may be provided. The system 300 may be an example of the above-described system 100 (FIG. 1). The system 300 may be configured to receive transaction ("txn") requests from a client device (not shown in FIG. 3) that are directed to a DRAM (not shown in FIG. 3), in the manner described above with regard to FIGS. 1-2. The system 300 may include a scrubber 302. The scrubber 302 may include a plurality of queues 304. The queues 304 may be an example of the above-described data storage structures 102 (FIG. 1). As further described below, the queues 304 may be organized in a manner corresponding to the organization of the DRAM. For example, each queue 304 may correspond to one bank of the DRAM.

The system 300 may further include a cache data (or "payload") memory 306. The cache data memory 306 may be configured to store (i.e., to cache) data that is the subject of DRAM transaction requests. Data stored in the cache data memory 306 may be referred to as cached data. Data may be stored in the cache data memory 306 in units commonly referred to as cache lines. The cache data memory 306 may be organized as a set-associative cache. Although a set-associative cache is well understood by one of ordinary skill in the art, the following brief description is provided as background.

A set-associative cache is addressable using address portions commonly referred to as "set" and "way." Conceptually, a set is a row in the cache. Each DRAM address maps to one of the sets. An "N-way set-associative cache" consists of some number (N) of ways, and each DRAM address may map to (or select) any one of the N ways in the set. A reference herein to looking up a tag means that the contents of all N ways are read (e.g., from the tag memory 310 described below), and the tag of each way as well as the Valid flag of each way are checked to determine whether a cache hit occurred in one of the ways of the set. A hit in one of the ways means that the data is cached in a location (e.g., in the cache data memory 306) associated with that way. The cache data memory 306 may be implemented in static RAM ("SRAM").

The system 300 may also include a tag processor 308, which may be an example of the above-described cache controller system 104 (FIG. 1) or portion thereof. Although not shown in FIG. 3 for purposes of clarity, the tag processor 308 may include a processor (e.g., configurable by software or firmware) or other logic (e.g., finite state machines, etc.) configurable to provide the functionality described below. As further described below, when the data that is the subject of a write request is stored in the cache data memory 306 (at a cache address) but has not yet been written to the DRAM, i.e., the cached data is "dirty," the tag processor 308 may store the cache address of the dirty data in a selected one of the queues 304. In other words, the queues 304 may be used to store the cache addresses (e.g., set and way) of dirty cache lines. A reference to a cache line being "registered" in the queues 304 means the cache address in which the cached data is stored in the cache data memory 306 is stored in the queues 304. The queue 304 in which that data (i.e., the cache address) is stored may be selected based on, for example, which DRAM bank corresponds to the target memory address associated with the write request. Although in the exemplary embodiment illustrated in FIG. 3 the queues 304 are used by the tag processor 308 to store the cache addresses of dirty cache lines, in other embodiments (not shown) such queues may be used to store other types of information or data associated with transaction requests.

The system 300 may include a tag memory 310. The tag memory 310 may be configured to store tags associated with cached data. As understood by one of ordinary skill in the art, a tag may be derived from a portion of the target address in a memory transaction request, and may be used to identify cached data. Each tag stored in the tag memory 310 may identify one cache line stored in the cache data memory 306. The tag memory 310 may be implemented in SRAM. As addressing a cache memory (e.g., by set and way), using stored tags to identify cached data, and other such data caching principles are well understood by one of ordinary skill in the art, such aspects are not described in further detail herein.

The tag memory 310 may be configured to store not only a tag itself but also information associated with the tag. Such information may include one or more flags associated with each tag that may indicate various states of the cache line identified by the tag. For example, a Valid flag may indicate whether the cache line identified by the tag is valid (i.e., the Valid flag is true) or invalid (i.e., the Valid flag is false). A Dirty flag may indicate whether the cache line identified by the tag is dirty (i.e., the Dirty flag is true) or clean (i.e., the Dirty flag is false). A Cleanable flag may indicate whether the cache line identified by the tag is registered in the queues 304 (i.e., the Cleanable flag is true) or is not registered in the queues 304 (i.e., the Cleanable flag is false). A Stale flag may indicate whether the cache line identified by the tag is older than a predetermined threshold age (i.e., the Stale flag is true) or is not older than the threshold age (i.e., the Stale flag is false). Aspects relating to cache line age are described below.

The system 300 may further include an arbiter 312, which in the illustrated embodiment may be included in the scrubber 302. More generally, however, the arbiter 312 may be an example of a portion of the above-described cache controller system 104 (FIG. 1) relating to controlling the eviction of dirty cache lines to the DRAM. As the arbiter 312 may include selection logic (not separately shown) based on the DRAM's rank, bank group and bank organization, the arbiter 312 may be referred to as having "DDR-aware" characteristics. Although not shown in FIG. 3 for purposes of clarity, the selection logic of the arbiter 312 may include a processor (e.g., configurable by software or firmware) or other logic (e.g., finite state machines, etc.) configurable in accordance with selection algorithms or methods, such as the exemplary methods described below. As further described below, based on such selection methods, the arbiter 312 may select from among the queues 304. Selected queues 304 are used to control which dirty cache lines are evicted from the cache data memory 306 to the DRAM. The system 300 may include a cache traffic processor 314, which, among other functions, may control the transfer of the evicted cache lines from the cache data memory 306. The result or output provided by the arbiter 312, identifying a cache line to evict or clean, may be referred to as a Clean transaction request. The tag processor 308 may direct Clean transaction requests to the cache traffic processor 314. A memory controller (e.g., as described above with regard to FIG. 2) may receive the evicted cache line data from the cache traffic processor 314 and control the manner in which the data is ultimately written to the DRAM.

The system 300 may also include a transaction buffer 316 configured to receive and buffer (e.g., in a transaction pool) incoming write requests from a client device (not shown in FIG. 3). The system 300 may further include an input arbiter 318 that is configured to select from among any transactions that may be in the buffer 316 and any Clean transaction that may be provided by the arbiter 312 and provide the selected transaction request to the tag processor 308. The input arbiter 318 may base the selection upon factors that may include, for example, a priority associated with each transaction, an age associated with each transaction request (e.g., how long a write transaction request has been in the transaction buffer 316), or other factors.

An incoming transaction request received by the system 300 may include not only a target address, data, length, etc., but also additional information. The additional information may include caching "hints." A client may include a caching hint in a write request to indicate, for example, whether the client prefers that the transaction be cached (a "write allocate" hint) or prefers that the transaction be passed through the system 300 without caching (a "write no-allocate") hint. A transaction request may also include an indication identifying a sub-cache. Although not shown in FIG. 3 for purposes of clarity, the system 300 may include multiple sub-caches, and different sub-caches may correspond to different priorities in which the transactions directed to one sub-cache are processed relative to the transactions directed to another sub-cache.

It should be noted that the arrows in FIG. 3 indicate flows relating to request-related aspects of write transactions; response-related aspects, such as the return flow of data in response to a request, are not indicated by the arrows in FIG. 3 for purposes of clarity. Also, in addition to being configured to process write requests in the manner described herein, the system 300 may be configured to process read requests. The system 300 may be configured to process read requests in any manner, including in a conventional manner. It should also be understood that the arrows in FIG. 3 indicate information flow in a conceptual manner, and are not intended to indicate specific physical interconnections, such as specific signal lines, buses, etc.

Figure 4:
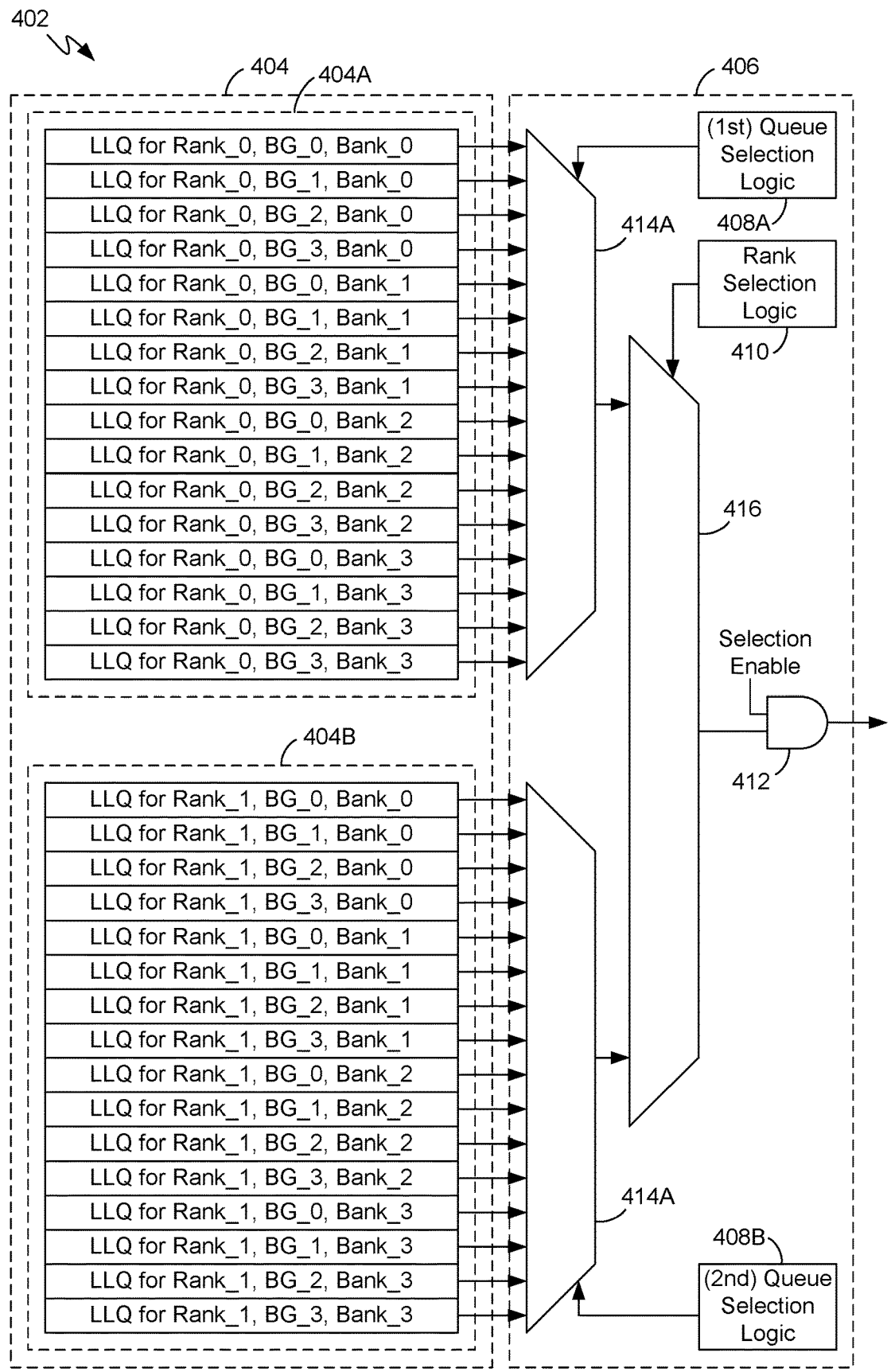
FIG. 4 is a block diagram of data structures and selection logic configured for controlling eviction of cached data to a DRAM, in accordance with exemplary embodiments.

As illustrated in FIG. 4, a scrubber structure 402 may include linked list queues ("LLQs") 404 and selection logic 406. The LLQs 404 may be examples of the queues 304 described above with regard to FIG. 3 and examples of the data storage structures 102 described above with regard FIG. 1. The LLQs 404 may be organized in a manner corresponding to the rank, bank group and bank organization of the DRAM (not shown). Accordingly, in an embodiment in which the DRAM has two ranks (Rank_0 and Rank_1), each consisting of four bank groups (BG0, BG1, BG2 and BG3), each consisting of four banks (totaling 32 banks), the LLQs 404 may be organized as a first sub-group 404A of 16 LLQs 404 corresponding to the 16 banks of one of the ranks (e.g. Rank_0) and a second sub-group 404B of 16 LLQs 404 corresponding to the 16 banks of the other rank (e.g. Rank_1).

In each sub-group 404A and 404B, the LLQs 404 may be organized by bank and bank group. In accordance with an exemplary pattern or organization, the bank group may increment from one LLQ 404 to the next, through each of the banks: a first LLQ 404 in each sub-group 404A and 404B may correspond to Bank_0 in BG_0; a second LLQ 404 in each sub-group 404A and 404B may correspond to Bank_0 in BG_1; a third LLQ 404 in each sub-group 404A and 404B may correspond to Bank_0 in BG_2; and a fourth LLQ 404 in each sub-group 404A and 404B may correspond to Bank_0 in BG_3. Continuing this pattern or organization with the next bank (i.e., Bank_1): a fifth LLQ 404 in each sub-group 404A and 404B may correspond to Bank_1 in BG_0; a sixth LLQ 404 in each sub-group 404A and 404B may correspond to Bank_1 in BG_1; a seventh LLQ 404 in each sub-group 404A and 404B may correspond to Bank_1 in BG_2, and an eighth LLQ 404 in each sub-group 404A and 404B may correspond to Bank_1 in BG_3. This pattern or organization may continue through Bank_2 and then Bank_3. In accordance with this pattern or organization, a 16th LLQ 404 corresponds to Bank_3 in BG3.

Each LLQ 404 may be implemented as a linked list (data structure). Although an exemplary linked list structure is described below, it may be noted that each entry in each LLQ 404 identifies a dirty cache line. The head entry in each LLQ 404 identifies a dirty cache line that may be a candidate for cleaning (i.e., eviction) before the next entry in that LLQ 404 becomes a candidate.

The selection logic 406 may be used to select a cache line for cleaning from among the candidate dirty cache lines. That is, the selection logic 406 may be used to select one LLQ 404 from among the 32 LLQs 404 and thereby select or identify the dirty cache line at the head of that selected queue (LLQ) 404. It should be understood that the selection logic 406 is depicted in a conceptual manner in FIG. 4 and may comprise, for example, a processor (e.g., configurable by software or firmware), finite state machine, or other logic. The selection logic 406 may be included in the arbiter 312 described above with regard to FIG. 3.

Conceptually, the selection logic 406 may comprise first queue selection logic 408A configured to select an LLQ 404 from among the 16 LLQs 404 of the first sub-group 404A corresponding to the banks of Rank_0, and second queue selection logic 408B configured to select an LLQ 404 from among the 16 LLQs 404 of the second sub-group 404B corresponding to the banks of Rank_1. Conceptually, the results produced by the first and second queue selection logic 408A and 408B may operate multiplexers or queue selectors 414A and 414B, respectively. Each of first and second queue selection logic 408A and 408B may operate independently of the other but in accordance with the same queue selection method, which is described below. The selection logic 406 may further conceptually include rank selection logic 410 configured to select between an LLQ 404 selected by the first queue selection logic 408A and an LLQ 404 selected by the second queue selection logic 408B. The rank selection logic 410 may operate in accordance with a rank selection method described below. Conceptually, the results produced by the rank selection logic 410 may operate a multiplexer or rank selector 416. The output of the rank selector 416 identifies one selected LLQ 404. Yet another method, described below, may control whether the selection logic 406 outputs an indication of that one selected LLQ 404 (i.e., an indication that a cache line has been identified for eviction) or does not output a selection (i.e., an indication that no cache line has been identified for eviction at that time). The method of controlling whether the rank selector 416 outputs an indication of a selected LLQ 404 (and thus an indication identifying a cache line) may be referred to as a scrubber enable or scrubber activation method. Selectively enabling the output of the rank selector 416 is conceptually represented in FIG. 4 by a 2-input logical-AND 412 having one input representing an indication of a selected LLQ 404 and another input representing a controlling determination by the scrubber enable method.

Referring briefly again to FIG. 3, the output of the selection logic 406 forms the scrubber output 320. The scrubber output 320 is provided to the input arbiter 318. As described above, if a cache line has been identified for eviction, the input arbiter 318 may select to proceed with evicting the identified cache line. If no cache line has been identified for eviction at that time, the input arbiter 318 may select an incoming transaction from the transaction buffer 316. The input arbiter 318 may select the clean request provided by the scrubber output 320 or a transaction from the transaction buffer 316 according to a priority. In one embodiment, the clean request provided by the scrubber output 320 may have the lowest priority and will be served only when no transactions are pending in the transaction buffer 316. In another embodiment, the priority of the clean request provided by the scrubber output 320 may be dynamically changed according to the fullness of the scrubber LLQ.

Figure 5:
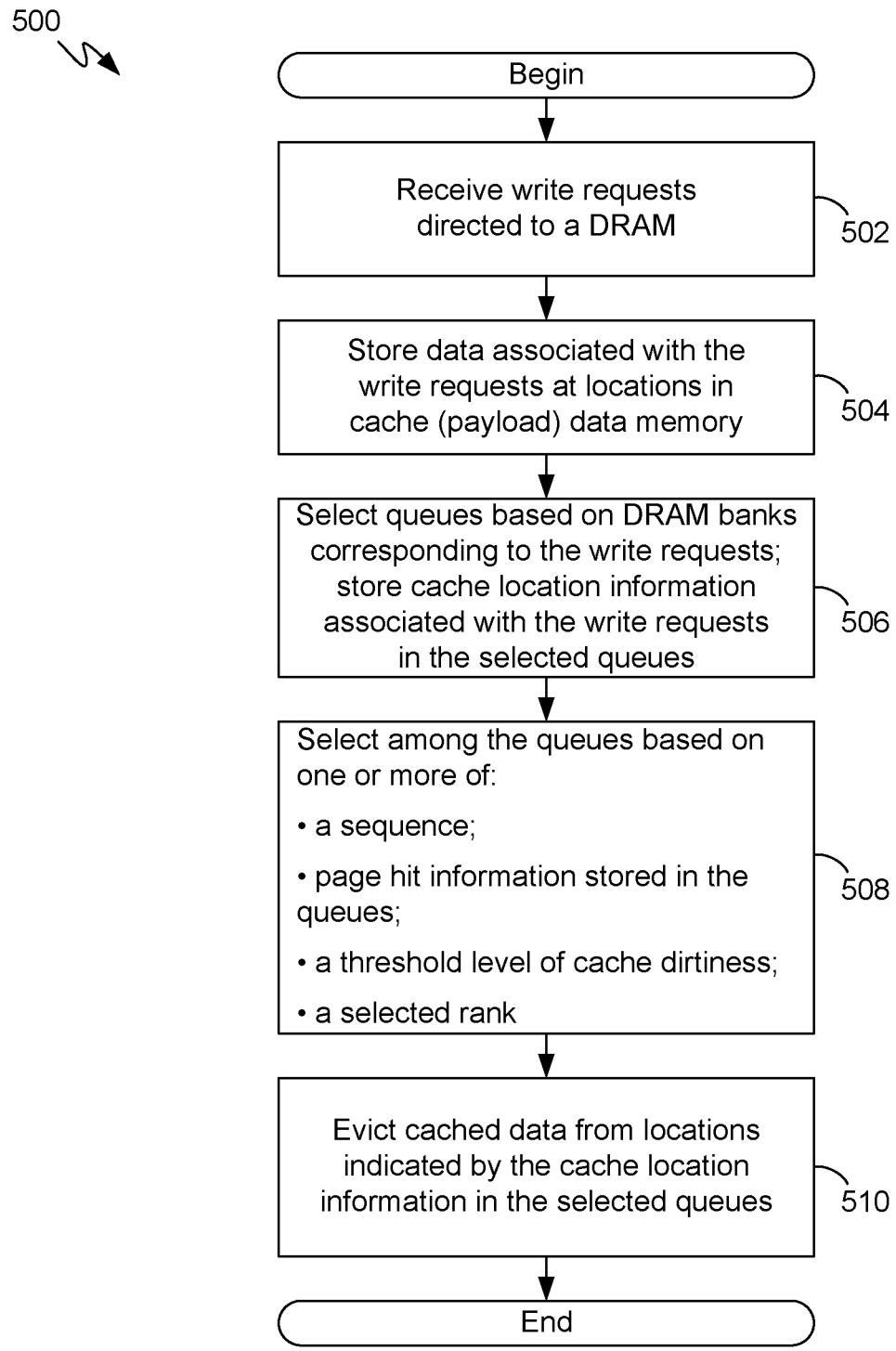
FIG. 5 is a flow diagram of a method for controlling aspects of data caching associated with DRAM write transaction requests, in accordance with exemplary embodiments.

In FIG. 5, a method 500 for controlling data caching is depicted in flow diagram form. The method 500 may, for example, represent aspects of the above-described operation of the system 300 (FIG. 3). Although the arrows in FIG. 5 (as well as FIGS. 8-14) indicate an order among the various blocks it should be understood that blocks are depicted in an order for convenience of description and guiding the reader through the method, and the operations or actions indicated by the blocks are not limited to such an order. Rather, in other exemplary methods such actions may be performed or otherwise may occur in various orders. Also, some actions may occur concurrently with others. For example, with regard to FIG. 5, actions relating to receiving transactions, storing information in the queues, etc., may occur substantially concurrently with actions relating to selecting from among the queues and using the information stored in selected queues to evict cached data. In relation to FIG. 3, operation of the tag processor 308 and related elements may occur substantially concurrently with operation of the scrubber 302. Further, in other exemplary methods some of the actions or operations may be omitted or combined with other actions.

As indicated by block 502, write requests may be received. The write requests may be received by, for example, the tag processor (FIG. 3). As indicated by block 504, data associated with write requests may be cached (e.g., in locations in the cache data memory 306 described above with regard to FIG. 3).

As indicated by block 506, queues may be selected based on DRAM banks corresponding to the write requests, and information associated with the write requests may be stored in the selected queues. For example, linked list LLQs 404 (FIG. 4) may be selected by the scrubber 302 (FIG. 3), and cache address information (e.g., set and way) indicating locations in the cache data memory 306 (FIG. 3) in which data associated with the write requests has been cached may be stored in selected LLQ s 404 (FIG. 4) as described above with regard to FIG. 4.

Although not shown for purposes of clarity, the actions described above with regard to blocks 502-506 may be performed essentially continuously, independently of other actions. Accordingly, the LLQs 404 (FIG. 4) may fill as additional write requests are received and information associated with the additional write requests stored in the queues. In the exemplary embodiments described herein, the information associated with the write requests may include not only cache address information (e.g., way and set) but also page hit indications, as described below.

Figure 6:
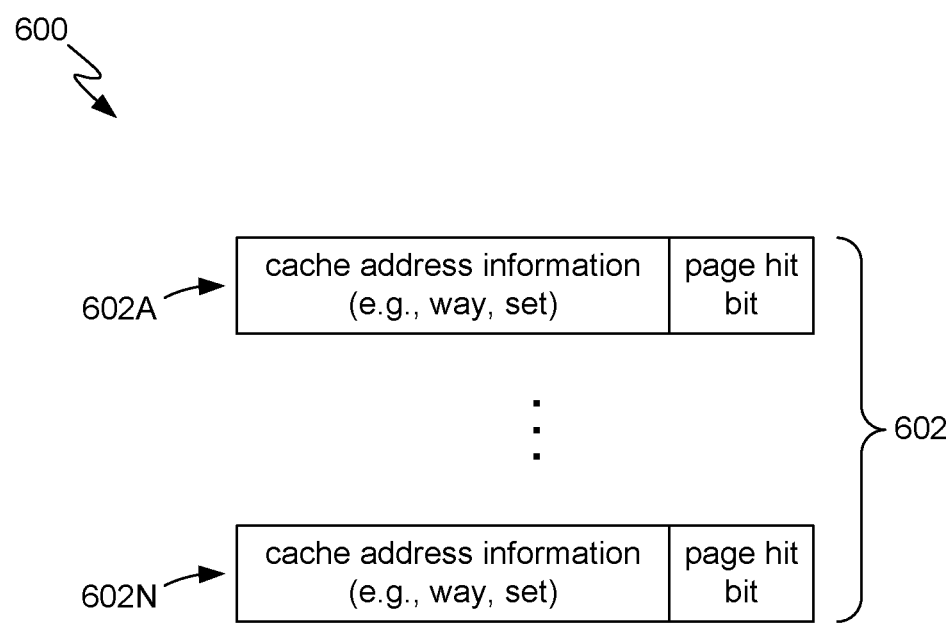
FIG. 6 is a data structure diagram illustrating linked lists configured to store cache address information and page hit bits, in accordance with exemplary embodiments.

In FIG. 6, a linked list queue or LLQ 600, which may be an example of each of the above-described data storage structures 102 (FIG. 1), queues 304 (FIG. 3) or LLQs 404 (FIG. 4), is illustrated. The LLQ 600 may comprise any number of entries 602 (or linked list "nodes," as sometimes referred to) from a first or "tail" entry 602A to a last or "head" entry 602N. As linked list principles are well understood by one of ordinary skill in the art, details such as pointers that link the nodes are not shown in FIG. 6 for purposes of clarity. Each entry 602 may include cache address information (e.g., way and set) and page hit information (e.g., a bit). The page hit bit indicates whether that entry 602 is a page hit with respect to the preceding entry in the LLQ 600.

Referring again to FIG. 3, the processing of a write request by the tag processor 308 may include controlling (e.g., via the cache traffic processor 314) storing the data that is the subject of the write request (the payload) in the cache data memory 306. The processing of a write request by the tag processor 308 may also include deriving a tag, way and set from the target address of the write request. The tag processor 308 may derive this cache address information in a conventional manner, as understood by one of ordinary skill in the art. The way and set determine the location (i.e., cache line) in the cache data memory 306 which the data is stored or cached. The tag may be stored in the tag memory 360 and used along with the target address of a subsequent transaction request (e.g., a read request) to uniquely identify whether the subsequent transaction request is directed to the same cached data.

When the data that is the subject of the write request is stored in a location in the cache data memory 306, the scrubber 302 (or alternatively, the tag processor 308) may also determine whether the write request is directed to the same DRAM page, i.e. the same row in the same bank in the same bank group in the same rank, as the DRAM page indicated by the tail of the queue 304 the write request is directed to. If two successive write requests are directed to the same DRAM page, the second write request may be referred to as a page hit with respect to the first write request, because the corresponding accesses to that DRAM row may occur in succession while the DRAM row remains open.

Based on the target address, the scrubber 302 (or alternatively, the tag processor 308) may determine the DRAM row, bank, bank group and rank addresses. When the data that is the subject of the write request is stored in a location in the cache data memory 306, the tag processor 308 may provide the way and set that together indicate that location to the scrubber 302. The scrubber 302 may select the corresponding one of the queues 304 and add a new entry (or with regard to FIG. 6, select one of the LLQs 602 and add a new (tail) entry or node). The scrubber 302 may store in the new entry the way and set as well as a bit indicating whether the cache line data located at that way and set is a page hit with respect to the preceding entry.

Returning to FIG. 5, another portion of the method 500 may relate to controlling a transfer of data to the DRAM. In an embodiment relating to operation of the system 300 (FIG. 3), data transfer from the cache data memory 306 to the DRAM may be controlled using the queues 304.

As indicated by block 508, controlling the transfer of data may include selecting among the queues 304. For example, referring again to FIG. 3, the arbiter 312 may select from among the queues 304. The arbiter 312 may select queues 304 in a repeated or iterative manner, i.e., selecting each successive or next queue 304 after selecting a previous queue 304. The arbiter 312 may base the queue selection in part on information obtained from the head entries of linked list queues, such as, for example, the page hit (bit) information. Note that a reference herein to selecting a queue 304 also refers to selecting an entry in the queue 304, and therefore further refers to selecting a dirty cache line identified by that entry. The arbiter 312 may select the queues 304 in this manner based on, for example, one or more of: a sequence; the page hit information; a threshold level of cache dirtiness; a selected rank; etc. These aspects of the operation of the arbiter 312 are described below with regard to FIGS. 11-13.

As indicated by block 510 (FIG. 5), the method 500 may include evicting cached data indicated by the selected queues. For example, queues 304 (FIG. 3) may be selected by the arbiter 312. A dirty cache line in a location in the cache data memory 306 identified by the selected (also referred to below as "winner") queue entry may be evicted. The scrubber output 320 may identify the selected dirty cache line to the tag processor 308 (via the input arbiter 318). The tag processor 308 may, in turn, identify the selected dirty cache line to the cache traffic processor 314. The cache traffic processor 314 may then control the transfer of the dirty cache line out of the cache data memory 306.

Figure 7:
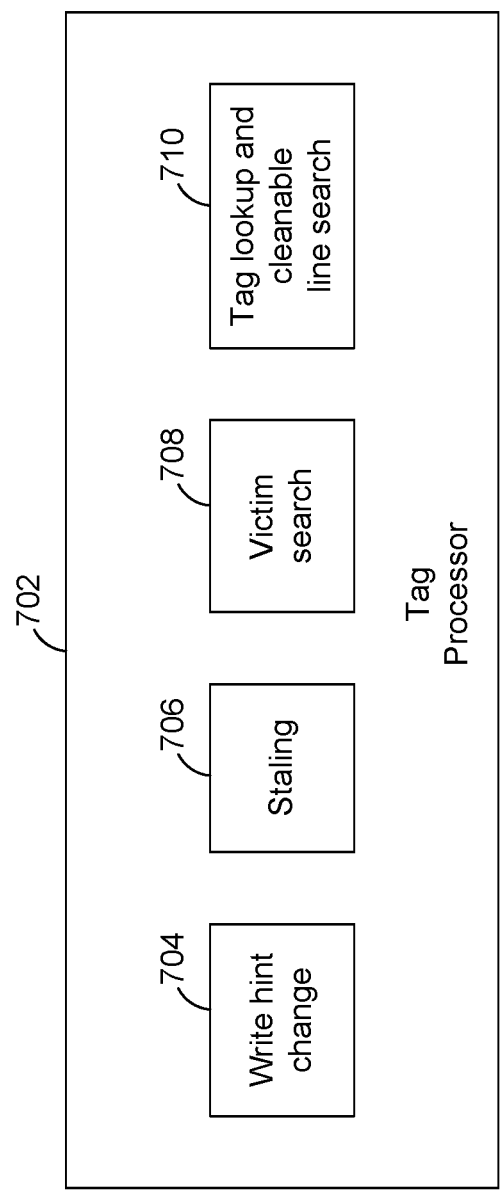
FIG. 7 is a block diagram of the tag processor of FIG. 3, in accordance with exemplary embodiments.

As indicated in FIG. 7, a tag processor 702 may include features relating to storing or caching the data that is the subject of a write request. The tag processor 702 may be an example of the above-described tag processor 308 (FIG. 3). In the illustrated example, such features may include write hint change logic 704, staling logic 706, victim search logic 708, and tag lookup and cleanable line search logic 710.

The write hint change logic 704 relates to a feature by which a client's write request may include a caching "hint" that indicates whether the data associated with the write request is to be cached (an "allocate" hint) or passed through the system 300 without caching (a "no allocate") hint. Exemplary embodiments may address a client's use of caching hints by changing "no allocate" hints to "allocate" under most circumstances.

Figure 8:
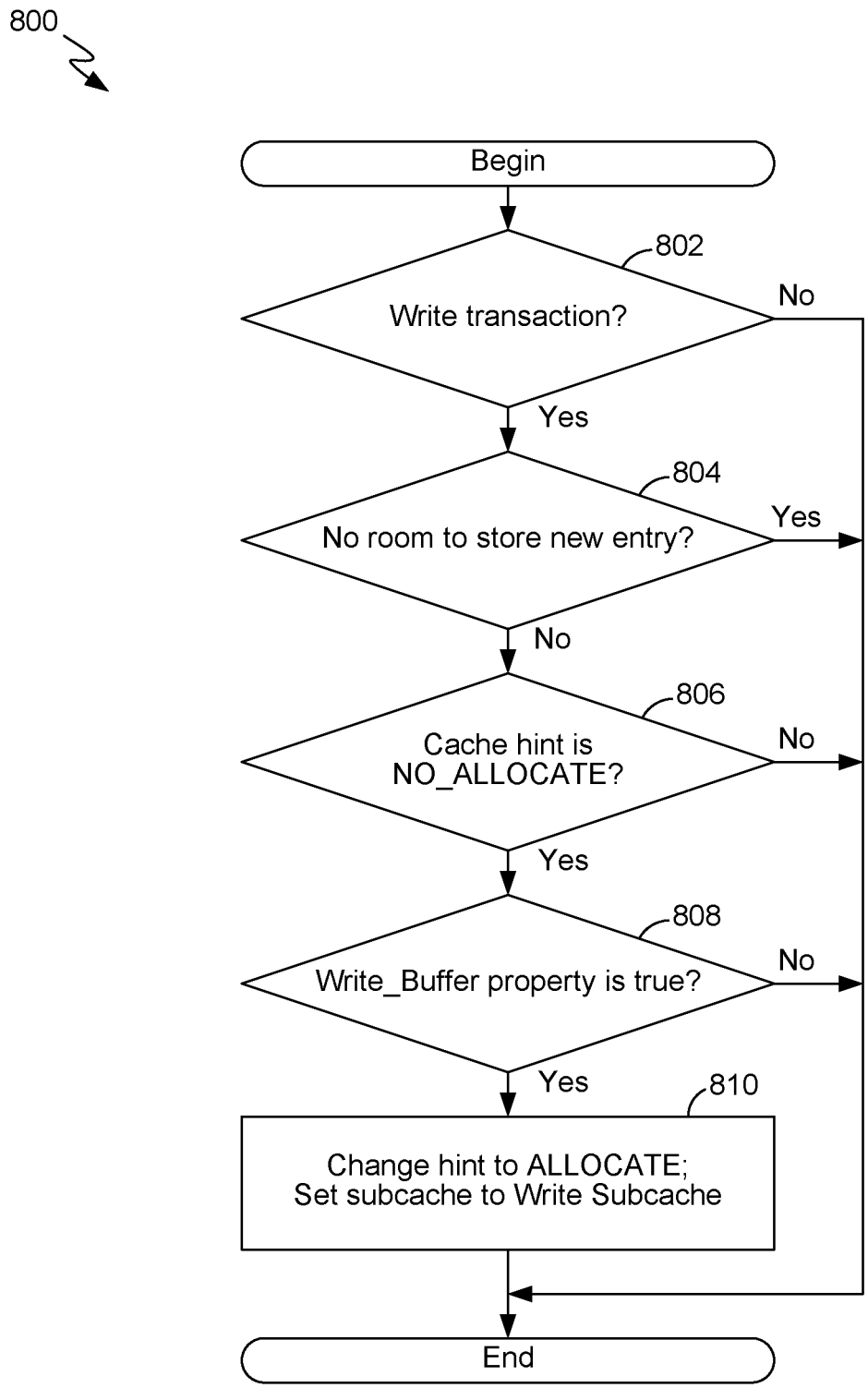
FIG. 8 is a flow diagram of a method for adjusting cache hints in a transaction request, in accordance with exemplary embodiments.

As illustrated in FIG. 8, the above-described write hint change logic 704 (FIG. 7) may be configured to control a method 800. Incoming transactions (e.g., from the arbiter 318 (FIG. 3)), may be provided to the write hint change logic 704 and processed in the following manner.

As indicated by block 802, it may be determined whether the incoming transaction request is for a write transaction. The exemplary embodiments described herein relate to write transactions. Nevertheless, aspects of the embodiments described herein may be applied in other embodiments to read transactions. If it is determined (block 802) that the incoming transaction is not a write request, the remainder of the method 800 is not performed.

If it is determined (block 802) that the incoming transaction is a write request, then it may be determined whether the selected queue (e.g., one of the LLQs 404 described above with regard to FIG. 4) is full or there is otherwise no room left in the LLQ 404 to store a new entry, as indicated by block 804. In the exemplary embodiment described herein, each queue may not have a predetermined size or capacity, and a new entry may be added to a queue only if the storage capacity used by the LLQs 404 is not full. Nevertheless, in other embodiments a queue may have a predetermined size. As described above, a queue may be selected based on, for example, which DRAM bank corresponds to the target memory address associated with the transaction request. If it is determined (block 804) that the selected queue is full, the remainder of the method 800 is not performed.

If it is determined (block 804) that the selected queue has room left to store a new entry, then it may be determined whether the write request includes a "no allocate" cache hint, as indicated by block 806. If it is determined (block 806) that the write request does not include a "no allocate" cache hint, the remainder of the method 800 is not performed. For example, if the write request includes an "allocate" cache hint, the method 800 does not change that transaction's cache hint, which thus remains "allocate."

If it is determined (block 806) that the write request includes a "no allocate" cache hint, then that cache hint may be changed to "allocate." However, whether the "no allocate" cache hint is changed to "allocate" may be conditioned upon a property of a sub-cache to which the write request is directed. As described above, a transaction request may include an indication identifying a sub-cache from among a number of sub-caches into which the cache system may be partitioned. One such sub-cache, which may be referred to as the Write Sub-Cache or "WRSC," may be used to cache the payloads whose locations are registered in the LLQ 404. Each sub-cache may have a property referred to herein as a "Write_Buffer" property, and the Write_Buffer properties of some sub-caches may be different from the Write_Buffer properties of other sub-caches. The Write_Buffer property may have one of two values: true or false. As indicated by block 808, it may be determined whether the Write_Buffer property of the sub-cache to which the write request is directed is true. If it is determined that the Write_Buffer property is true, then write requests having a "no allocate" hint may be allocated to the WRSC sub-cache and the associated information may be registered in (i.e., stored in) the queues as described above. If it is determined (block 808) that the Write_Buffer property of the sub-cache to which the write request is directed is not true, i.e., is false, then write requests having an "allocate" hint may be registered in the selected queue at a later point when (not shown in FIG. 8) the cached data is stale and selected by the tag lookup and cleanable line search logic 710 (FIG. 7). A method by which cached data may be tagged with a "stale" indication, referring to as a "staling" method, is described below. If it is determined (block 808) that the Write_Buffer property is true, then the "no allocate" cache hint of that write request may be replaced with an "allocate" cache hint, as indicated by block 810. As also indicated by block 810, the indication of the sub-cache to which the write transaction is directed may be replaced with an indication of the Write Sub-Cache.

Referring briefly again to FIG. 7, the tag lookup and cleanable line search logic 710 relates to further processing the write request after the write hint change logic 704 has performed the above-described method 800 (FIG. 8). As described below, such processing may include looking up a tag associated with the write request, searching for a location in which to store or cache the data associated with the write request, etc.

Figure 9A:
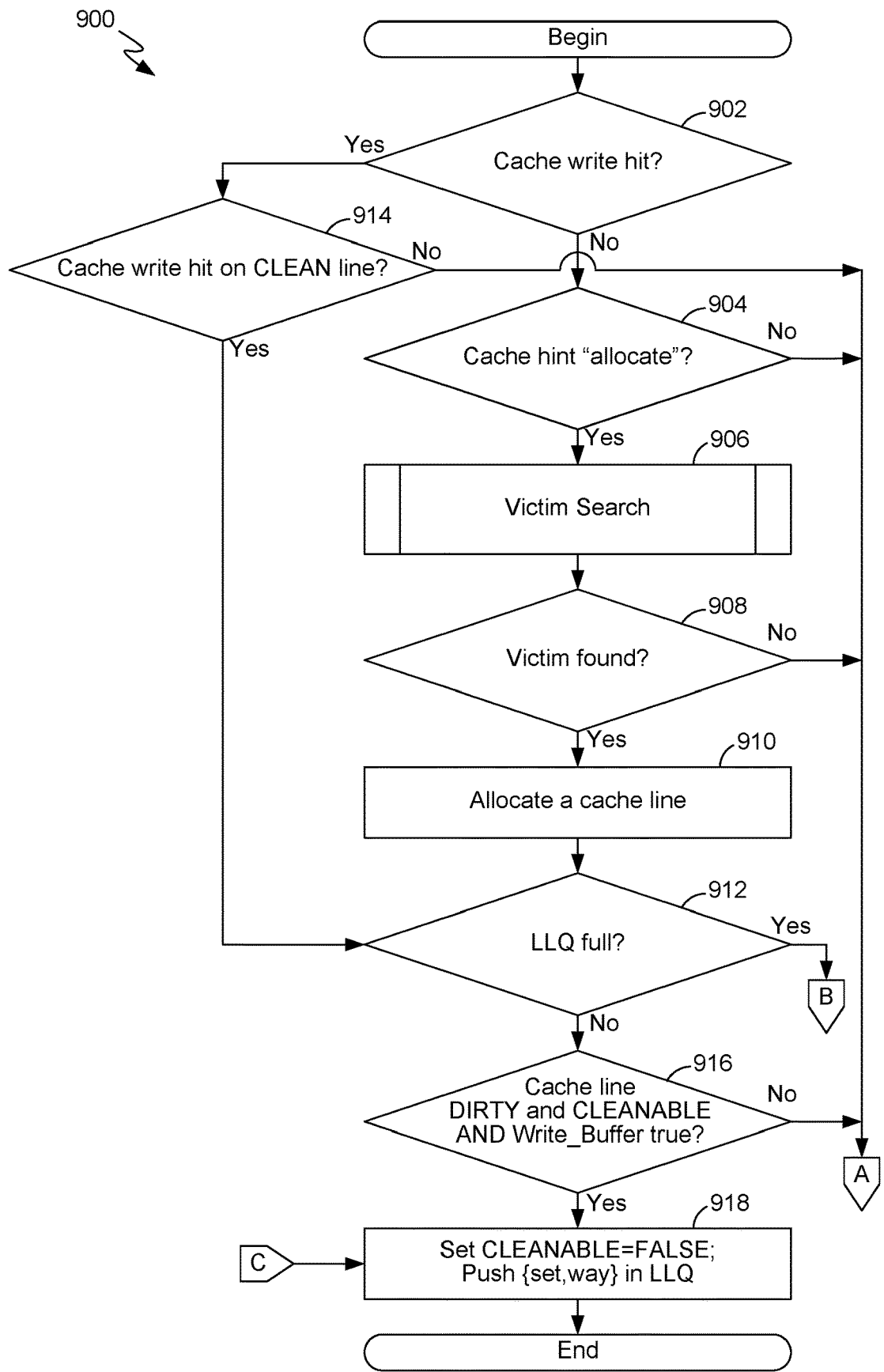
FIG. 9A is a flow diagram of a method for allocating a cache line based on a write request and storing associated information in selected linked list queues, in accordance with exemplary embodiments.
Figure 9B:
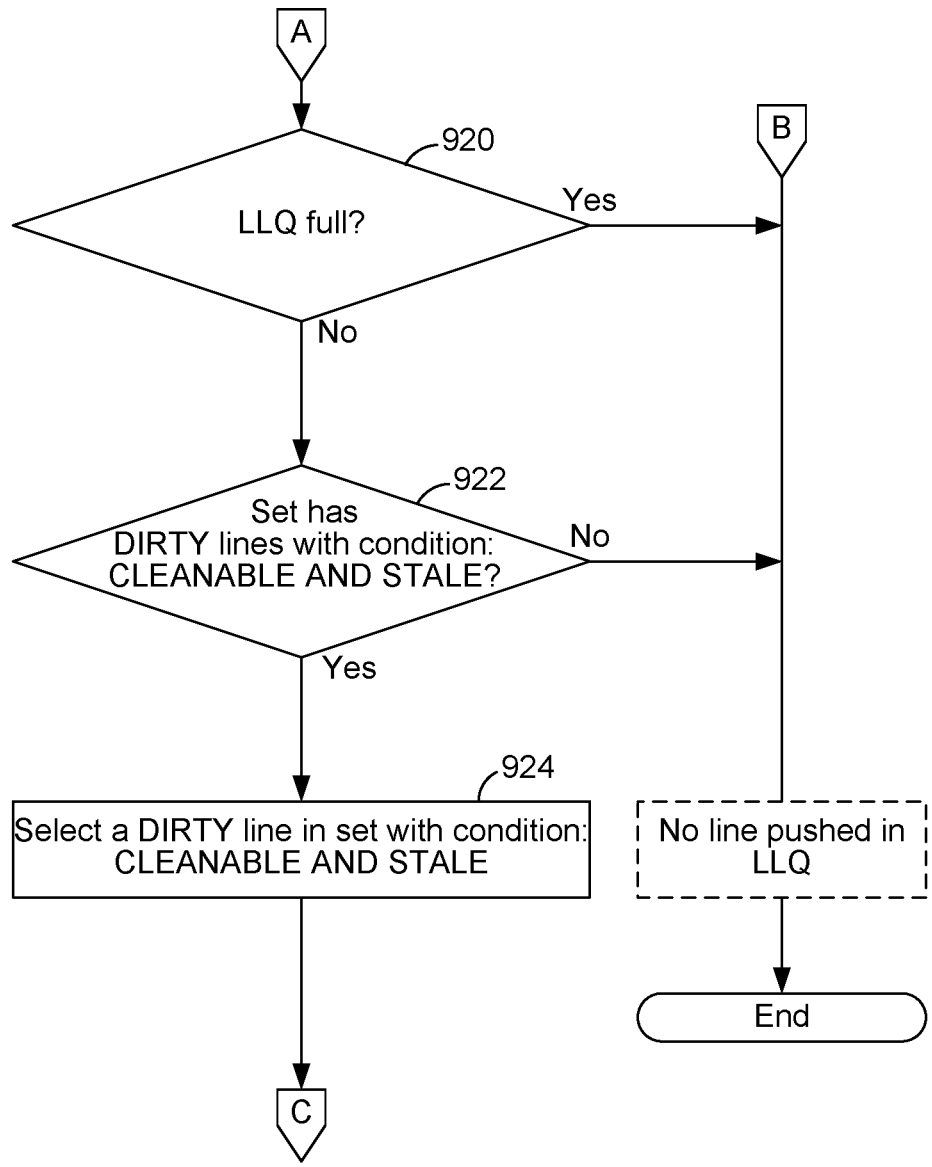
FIG. 9B is a continuation of the flow diagram of FIG. 9A.

As illustrated in FIGS. 9A-9B, the tag lookup and cleanable line search logic 710 (FIG. 7) may be configured to control a method 900. Alternatively, or in addition, the scrubber 302 (FIG. 3) may be configured to control a portion of the method 900.

Although not shown in FIGS. 9A-9B, before tag lookup is performed (as described below), the staling logic 706 (FIG. 7) may operate to check the age of each cache line in the set being accessed by the tag lookup operation. If the age of a cache line exceeds a predetermined threshold, the Stale flag may be set to a state of true. The age of a cache line may be calculated by comparing a current time with a time stamp that was associated to the cache line when it was allocated in the cache. Each subcache may have its own current time which is progressing at each new allocation in that subcache.

As indicated by block 902, it may be determined whether the write request results in a cache hit. (Note that a "cache hit" is not the same as the DRAM "page hit" described above.) Whether a write request results in a cache hit may be determined in a conventional manner. For example, as understood by one of ordinary skill in the art, for an N-way set-associative cache, each set contains N ways or degrees of associativity. Each way include a data block, the tag, and the above-described Valid flag, Dirty flag, Cleanable flag, and Stale flag. The set and way may be determined from a portion of the target address associated with the write request. In the exemplary embodiment, the tag and associated flags may then be read from the tag memory 310 (FIG. 3). (In the exemplary embodiment, the cached data (lines) may be stored separately in the cache data memory 306.) For each way in a set, the tag read from the tag memory 310 is compared with the tag bits of the target address of the write request, and if they match, and if the Valid flag is true, then it is determined that the write request results in a cache hit. Note that the above-referenced target address decoding may also identify the DRAM rank, bank group and bank to which the write request is directed and thereby identify or select one of the LLQs 404 (which may be referred to herein as the LLQ 404 or the selected LLQ 404).

If it is determined (block 902) that the write request does not result in a cache hit, then further processing may be performed to determine a location in the cache data memory 306 (FIG. 3) in which the data may be stored and to add an entry to the LLQ 404 indicating that location contains dirty data. Preliminary to this further processing, it may be determined whether the write request includes an "allocate" cache hint, as indicated by block 904.

If it is determined (block 904) that the write request includes an "allocate" cache hint, then a victim search method may be performed. Block 906 indicates performing a victim search method that is further described below. A result of performing the victim search method may be a location of a "victim" cache line in the cache data memory 306 (FIG. 3). However, another possible result of the victim search method may be that no victim cache line has been found. Furthermore, the victim search method may prefer choosing clean victim line to minimize the occurrence of dirty line eviction that would pollute the DRAM aware stream of write back consecutive to the scrubber operations.

As indicated by block 908, it may be determined whether a victim cache line was found. If it is determined (block 910) that a victim cache line was found, then that cache line may be allocated for the data associated with the write request. The data associated with the write request is thus stored in the allocated cache line in the cache data memory 306. Also, as described below, the tag memory 310 may be updated, and an entry may be added to the LLQ 404. Adding an entry to the LLQ 404 may be conditioned upon some further conditions, one of which is that the LLQ 404 is not yet full, as indicated by block 912.

Referring back to block 902, if it is determined that the write request results in a hit, then it may be determined as indicated by block 914 whether the hit is on a clean line (i.e., the Dirty flag has a state of false). If it is determined that the hit is on a clean line, the method 900 may return to above-described block 912, where it may be determined whether the LLQ 404 is full. If it is determined (block 912) that the LLQ 404 is full, then the method 900 ends with respect to the processing of that write request, and no entry is added to the LLQ 404.

If it is determined (block 912) that the LLQ 404 is not full, then another combination of conditions may be determined, as indicated by block 916: the cache line is dirty (i.e., the Dirty flag has a state of true), and the cache line is cleanable (i.e., the Cleanable flag has a state of true), and the above-described Write_Buffer property has a state of true. As noted above, a true Cleanable flag means that the cache line is not yet registered in the LLQ 404.

If the above-described combination of conditions is determined (block 916) to be true, then an entry may be added to the LLQ 404, as indicated by block 918. A new "head" of the LLQ 404, comprising the set and way address of the allocated cache line, may be "pushed" or added to the LLQ 404, effectively placing the entry that was previously the head behind the new head. The new head row information may be compared to the row information of the previous head to determine if the pageHit flag is true. The pageHit flag is also pushed into the queue. The Cleanable flag in the location in the tag memory 310 associated with the allocated cache line may be set to a state of false. The write request having been processed in the above-described manner may signify the end of the method 900 with respect to that write request.

Nevertheless, if it is determined in accordance with above-described block 914 that cache hit is not on a clean line, or if it is determined in accordance with above-described block 904 that the cache hint is not "allocate," or if it is determined in accordance with above-described block 908 that no victim cache line was found, or if it is determined that the combination of conditions described above with regard to block 916 is not true, then the method 900 may continue (see FIG. 9B) as indicated by block 920.

It may then be determined (block 920) whether the LLQ 404 is full. If it is determined that the LLQ 404 is full, then the method 900 ends with respect to the processing of that write request, and no entry is added to the LLQ 404.

If it is determined (block 920) that the LLQ 404 is not full, then as indicated by block 922 it may be determined whether the set has any cache lines having the combination of conditions: dirty, cleanable, and stale (i.e., the Dirty, Cleanable, and Stale flags are all true). If that combination of conditions is determined to be true, then one of those cache lines (e.g., the first such cache line found) may be selected for adding to the list of dirty cache lines in the LLQ 404, as indicated by block 924. Returning to block 918 (FIG. 9A), an entry for that cache line may then be added to the LLQ 404.

Figure 10:
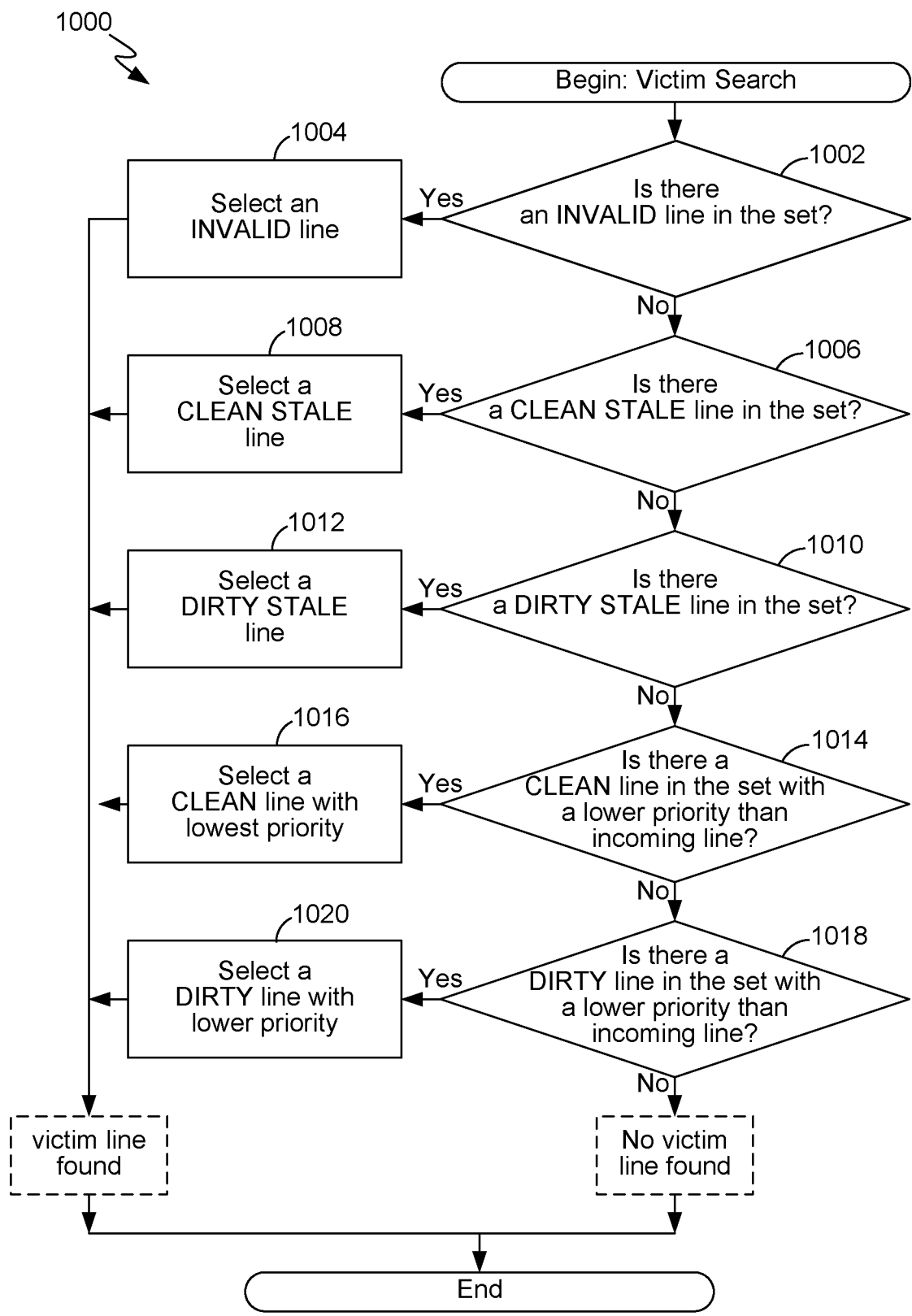
FIG. 10 is a flow diagram of a method for searching for a victim cache line for replacement, in accordance with exemplary embodiments.

As illustrated in FIG. 10, a "victim search" method 1000 may be an example of the sub-method of the above-described method 900 (FIG. 9A) that is indicated by block 906. As indicated by block 1002, it may be determined whether there are one or more invalid lines (i.e., the Valid flag is false) in the set. If it is determined (block 1002) that there are one or more invalid lines in the set, then one of those invalid lines may be selected as the victim line, as indicated by block 1004. If more than one such line is found, then the first such line that is found may be selected in accordance with block 1004.

However, if it is determined (block 1002) that there are no invalid lines in the set, then it may be determined whether there are one or more clean stale lines (i.e., the Clean and Stale flags are true) in the set, as indicated by block 1006. If it is determined (block 1006) that there are one or more clean stale lines in the set, then one of those clean stale lines may be selected as the victim line, as indicated by block 1008. If more than one such line is found, then the first such line that is found may be selected in accordance with block 1008. It should be understood that the likelihood to find a clean stale line is high as the scrubber is ensuring a low level of dirty lines in the cache and the staling process ensure a high probability to find a stale line in each set.

However, if it is determined (block 1006) that there are no clean stale lines in the set, then it may be determined whether there are one or more dirty stale lines in the set, as indicated by block 1010. If it is determined (block 1010) that there are one or more dirty stale lines in the set, then one of those dirty stale lines may be selected as the victim line, as indicated by block 1012. If more than one such line is found, then the first such line that is found may be selected in accordance with block 1012. It should be understood that selecting a dirty victim will cause a dirty eviction and consequently pollute the DRAM aware stream of write back consecutive to the scrubber operations.

However, if it is determined (block 1010) that there are no clean stale lines in the set, then it may be determined whether there are one or more clean lines in the set that have a lower priority than the incoming line (i.e., the priority of the write request being processed), as indicated by block 1014. As described above, the "priority" of a write request may refer to the priority of the sub-cache to which the write request is directed, as each sub-cache may have a predetermined priority relative to other sub-caches. If it is determined (block 1014) that there are one or more clean lines in the set that have a lower priority than the incoming line, then one of those lines having the lowest priority may be selected as the victim line, as indicated by block 1016. If two or more lines each have the lowest level of priority, then the first such line that is found may be selected in accordance with block 1016.

However, if it is determined (block 1014) that there are no clean lines in the set that have a lower priority than the incoming line, then it may be determined whether there are one or more dirty lines in the set that have a lower priority than the incoming line, as indicated by block 1018. If it is determined (block 1018) that there are one or more dirty lines in the set that have a lower priority than the incoming line, then one of those lines may be selected as the victim line, as indicated by block 1020. If more than one such line is found, then the first such line that is found may be selected in accordance with block 1020. However, if it is determined (block 1018) that there are no clean lines in the set that have a lower priority than the incoming line, then the result of the method 1000 may be that no victim line is found.

An alternative victim search method (not shown) may be similar to the above-described method 1000 (FIG. 10), except that dirty lines may be omitted from consideration as victim line candidates. Accordingly, in the alternative method blocks 1010, 1012, 1018 and 1020 may be omitted. That is, the method flow may proceed from a "no" determination in block 1006 directly to block 1014.

The above-described methods 800 (FIG. 8), 900 (FIGS. 9A-9B) and 1000 (FIG. 10) relate to caching data associated with incoming transaction requests and registering dirty cache lines in the LLQs 404 (FIG. 4). The methods 800, 900 and 1000 thus may also represent examples of processing described above with regard to blocks 502, 504 and 506 of the method 500 (FIG. 5).

Figure 11:
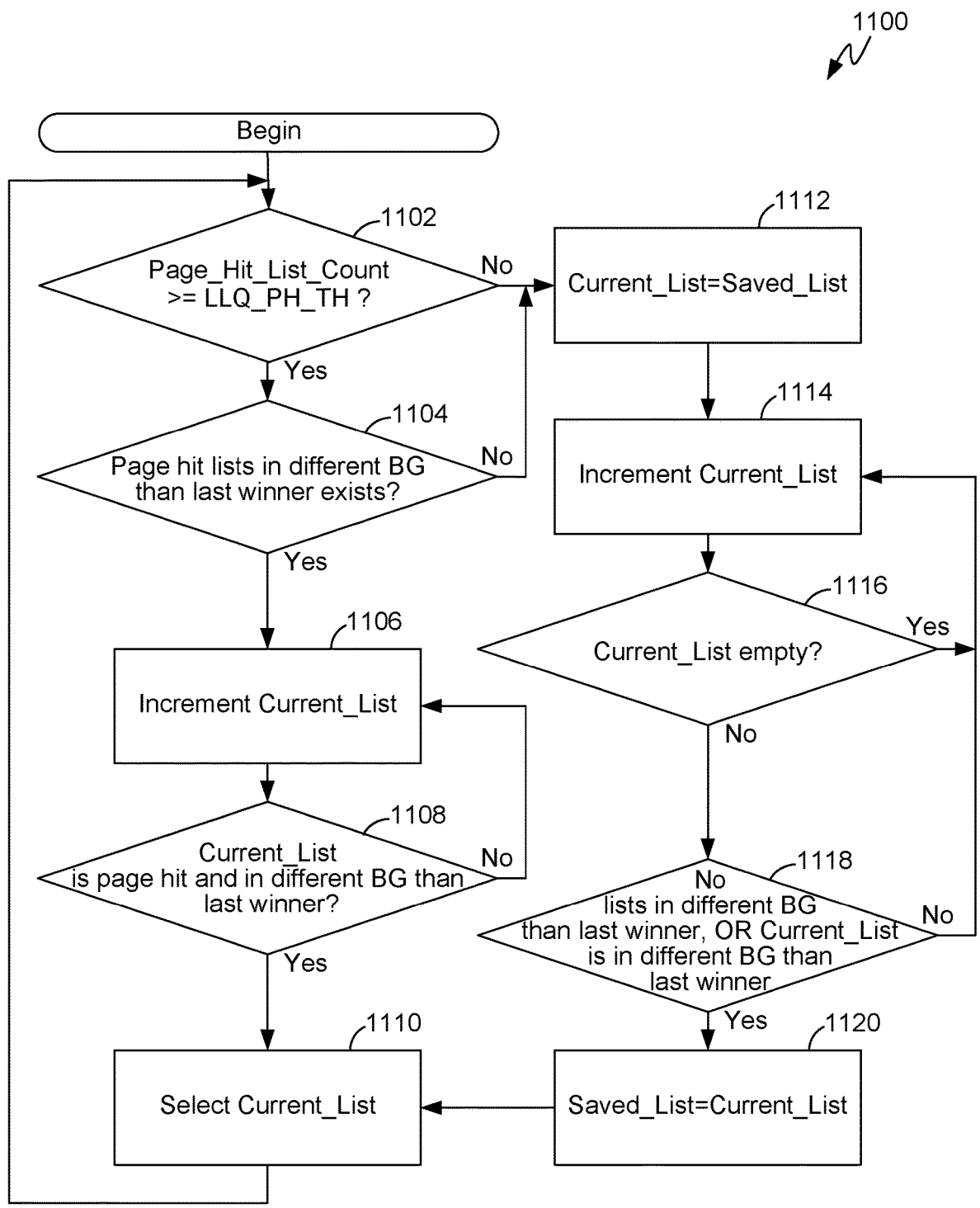
FIG. 11 is a flow diagram of a method for selecting a linked list queue from among a group of linked list queues, in accordance with exemplary embodiments.

As illustrated in FIG. 11, a method 1100 relating to controlling the transfer of cached data to the DRAM using the LLQs 404 (FIG. 4) is depicted in flow diagram form. The method 1100 may represent a portion of the processing described above with regard to blocks 508 and 510 of the method 500 (FIG. 5). The method 1100 may represent an example of selecting among the LLQs 404 of the sub-group 404A or 404B (FIG. 4) based on a sequence. The method 1100 may control the selection that is conceptually represented in FIG. 4 by the queue selection logic 408A and 408B. The first and second queue selection logic 408A and 408B (FIG. 4) may operate independently of each other. Stated another way, two instances of the method 1100 may operate independently of and concurrently with each other, a first instance of the method 1100 controlling the selection represented by the first queue selection logic 408A, and a second instance of the method 1100 controlling the selection represented by the second queue selection logic 408B. The selection logic 406 (FIG. 4) may be configured to control the two instances of the method 1100.

As indicated by block 1102, it may be determined whether the page hit list count (Page_Hit_List_Count) is greater than or equal to a predetermined threshold number (LLQ_PH_TH). The page hit list count is the number of LLQs 404 (FIG. 4) in which the head entry (page hit bit) indicates a page hit. If it is determined (block 1102) that the page hit list count is greater than or equal to the threshold number, then it may be determined whether there are one or more LLQs 404 having head entries indicating page hits in a different bank group than the "last winner" (i.e., the LLQ 404 that was most recently selected by the method 1100), as indicated by block 1104. If there is no "last winner" because the determination in block 1104 is a first iteration after initially beginning the method 1100, then the determination in block 1104 may default to a result of "yes." If it is determined (block 1104) that there are one or more LLQs 404 having head entries indicating page hits in a different bank group than the "last winner" (or the determination defaults to "yes"), then the current list (Current_List) may be incremented. The method 1100 maintains a record or pointer to one of the lists or LLQs 404 (FIG. 4) that may be referred to as the "current list."

Incrementing the current list means that the next LLQ 404 in the sequence becomes the new current list. For example, if the current list is the LLQ 404 for Bank 0 in BG0, the next list in the sequence is the LLQ 404 for Bank 0 in BG1. Stated another way, referring to the LLQ 404 for Bank_0 in BG0 as the first LLQ 404 and to the LLQ 404 for Bank_3 in BG3 as the 16th LLQ 404, then the lists may be incremented from the first LLQ 404 to the second LLQ 404, etc., to the 16th LLQ 404. The incrementing that is performed in accordance with block 1106 is modulo 16. That is, if the 16th LLQ 404 (i.e., Bank_3 in BG3) is the current list, then incrementing the current list means that the first LLQ 404 (i.e., Bank_0 in BG0) becomes the new current list. It may be noted that the sequence represented by the method 1100 is based on a round-robin sequence among the LLQs 404. While a conventional round-robin sequence would progress from each LLQ 404 to the next without regard to other conditions, the method 1100 represents a modification of a conventional round-robin sequence based on the page hit information.

As indicated by block 1108, after incrementing the current list, it may then be determined whether the current list (head entry) indicates a page hit and that page hit is in a different bank group than the last winner. If it is determined that the current list indicates a page hit and in a different bank group than the last winner, then the current list is selected, as indicated by block 1110. Referring to FIG. 4, information identifying a first selected list is conceptually the output of the first selection logic 408A, and information identifying a second selected list is conceptually the output of the second selection logic 408B. The method flow returns from block 1110 to block 1102 in an iterative manner. Note that the selected list also becomes the new "last winner" for purposes of blocks 1104, 1108, etc.

If it is determined (block 1102) that the page hit list count is not greater than or equal to the threshold number, i.e., the page hit list count is less than the threshold number, then the current list may be assigned a value of a saved list (Saved_List). That is, the saved list becomes the new current list. If there is no "saved list" because the method flow has reached the block 1112 on a first iteration of the method 1100, then the saved list may be the same as the current list. That is, the saved list may initially be set to the same list as the current list when the method 1100 begins operating. Also, referring back to block 1104, if it is determined that there are no LLQs 404 having head entries indicating page hits in a different bank group than the last winner, then the method 1100 continues as described above with regard to block 1112.

As indicated by block 1114, after the saved list becomes the new current list (block 1112) the current list may be incremented. Then, as indicated by block 1116, it may then be determined whether the current list is empty. If it is determined that the current list is empty, then the current list may be incremented (block 1114) until the current list is not empty.

As indicated by block 1118 it is determined (block 1116) that the current list is not empty, then it may be determined whether there are one or more lists in a different bank group than the last winner, or if the current list is in a different bank group than the last winner. If it is determined that there are no lists in a different bank group than the last winner, or the current list is in a different bank group than the last winner, then the current list may become the saved list (i.e., the current list is saved for a next iteration of the method 1100), as indicated by block 1120. However, if it is determined that there are one or more lists in a different bank group than the last winner, and the current list is not in a different bank group than the last winner, then the current list may be incremented and the method 1100 may continue as described above with regard to block 1114.

Figure 12:
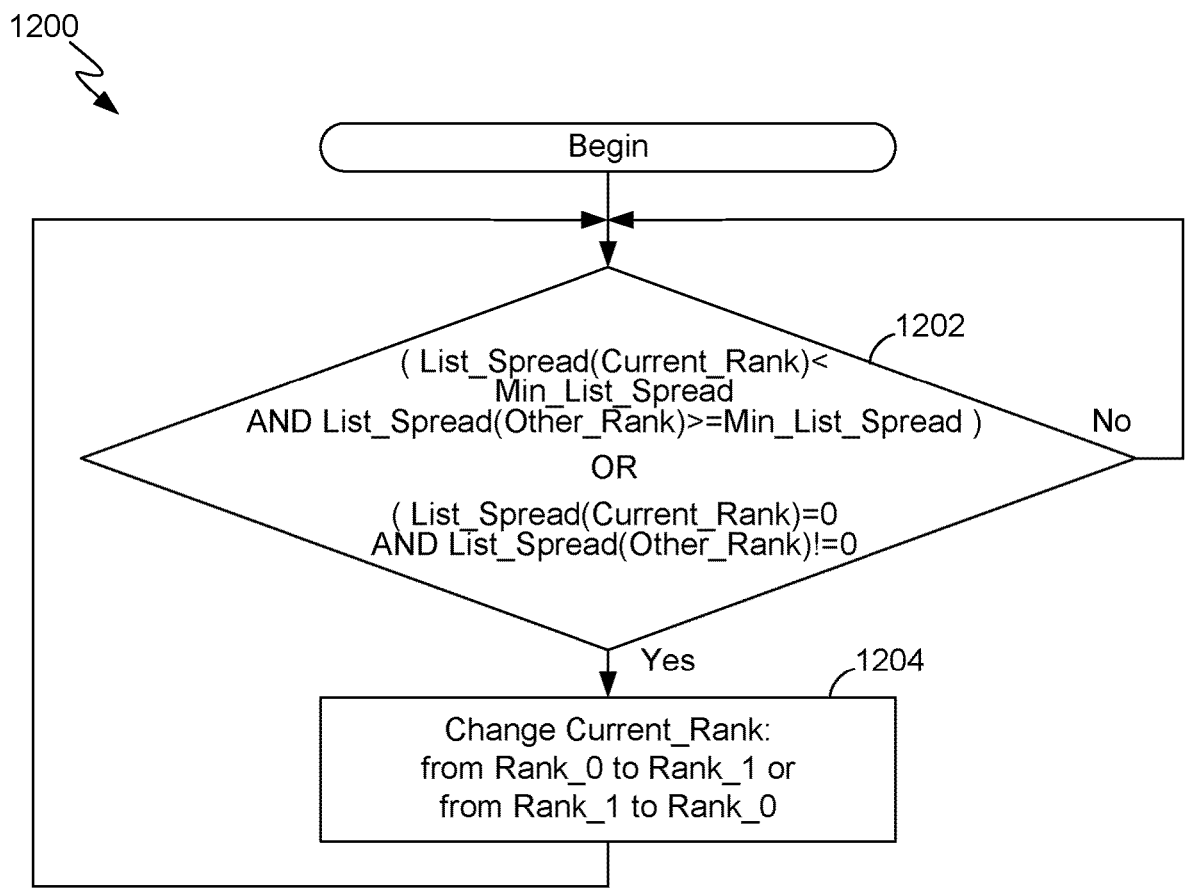
FIG. 12 is a flow diagram of a method for selecting between two groups of linked list queues corresponding to two DRAM ranks, in accordance with exemplary embodiments.

As illustrated in FIG. 12, a method 1200 relating to selecting a rank is depicted in flow diagram form. The method 1200 may represent a portion of the processing described above with regard to block 508 of the method 500 (FIG. 5). With further reference to FIG. 4, the selection logic 406 may be configured to control the method 1200. The method 1200 selects a rank (e.g., Rank_0 or Rank_1 in the exemplary embodiment). The rank selection logic 410 may be configured in accordance with the method 1200. The rank selection logic 410 is thus configured to select a rank. In FIG. 12, whichever of Rank_0 and Rank_1 was previously selected at the time the determination indicated by block 1202 is begun is referred to as the "current rank" (Current_Rank), and whichever of Rank_0 and Rank_1 is not the current rank referred to as the "other rank" (Other Rank). The current rank may be initialized to either rank prior to the first iteration through the method 1200. In FIG. 12, the term "list spread" (List_Spread) refers to the number of LLQs 404 in a rank that are not empty. The term "minimum list spread" refers to a threshold number that may be predetermined or fixed.

As indicated by block 1202, a first condition may be determined: whether the list spread of the current rank is less than the minimum list spread and the list spread of the other rank is greater than or equal to the minimum list spread. As also indicated by block 1202, a second condition may be determined: the list spread of the current rank is equal to zero and the list spread of the other rank is not equal to zero. If it is determined that either of the first or second conditions is true, then the current rank may be changed or switched to the other rank, as indicated by block 1204. That is, the current rank becomes the other rank, and vice versa. Following block 1204, the method 1200 may return to block 1202. However, if it is determined (block 1202) that neither of the first and second conditions is true, then the method 1200 may return to block 1202 without changing the current rank. That is, the determination indicated by block 1202 may be repeated essentially continuously without changing the rank so long as neither the first nor second condition is true.

Referring briefly again to FIG. 4, the output of the rank selection logic 410 is an indication identifying either an LLQ 404 in Rank_0 selected by the first queue selection logic 408A or an LLQ 404 in Rank_1 selected by the second queue selection logic 408B. In the illustrated embodiment, the output of the rank selection logic 410 becomes the output of the selection logic 406 (conceptually represented by a logical-AND symbol in FIG. 4) only if the selection enable logic 412 is enabled; if the selection enable logic 412 is not enabled, then the output of the selection logic 406 is an indication that no LLQ 404 is currently selected. In the illustrated embodiment, a scrubber enable or scrubber activation method, described below with regard to FIG. 13, may control whether the selection enable logic 412 is enabled. Nevertheless, it should be understood that such a scrubber enable or activation method may enable any of the above-described logic and methods relating to controlling the transfer of cached data to the DRAM using the LLQs 404; enabling the output of the selection logic 406 as a final action immediately before the output, after queue selection by queue selection logic 408A and 408B and rank selection by rank selection logic 410, is intended only as an example.

The method 1300 (FIG. 13) may control whether the scrubber 302 (FIG. 3) is active or inactive, since in the exemplary embodiment the selection logic 406 (FIG. 4) effectively controls the scrubber operation. When the scrubber 302 is active, it identifies dirty cached data for eviction to the DRAM. Evicting (or "cleaning") decreases cache dirtiness. The method 1300 attempts to adjust the level of scrubber activity to maintain a level of cache dirtiness within a range or window between a high threshold (HT) and a low threshold (LT). This feature may be beneficial in examples of operation in which read and write traffic are competing with each other for memory controller bandwidth. For example, in a PCD write request traffic from a camera client may compete with read request traffic from a display client.

The selection logic 406 (FIG. 4) or other element of the scrubber 302 (FIG. 3) may be configured to monitor the total number of linked list entries among all of the LLQs 404 as a measure of cache dirtiness. For example, a count of the total number of entries among all of the LLQs 404 may be incremented when an entry is added (or "pushed") and decremented when an entry is removed (or "popped") in conjunction with an eviction. In the method 1300 this measure of cache dirtiness is referred to as "LLQ level."

Figure 13:
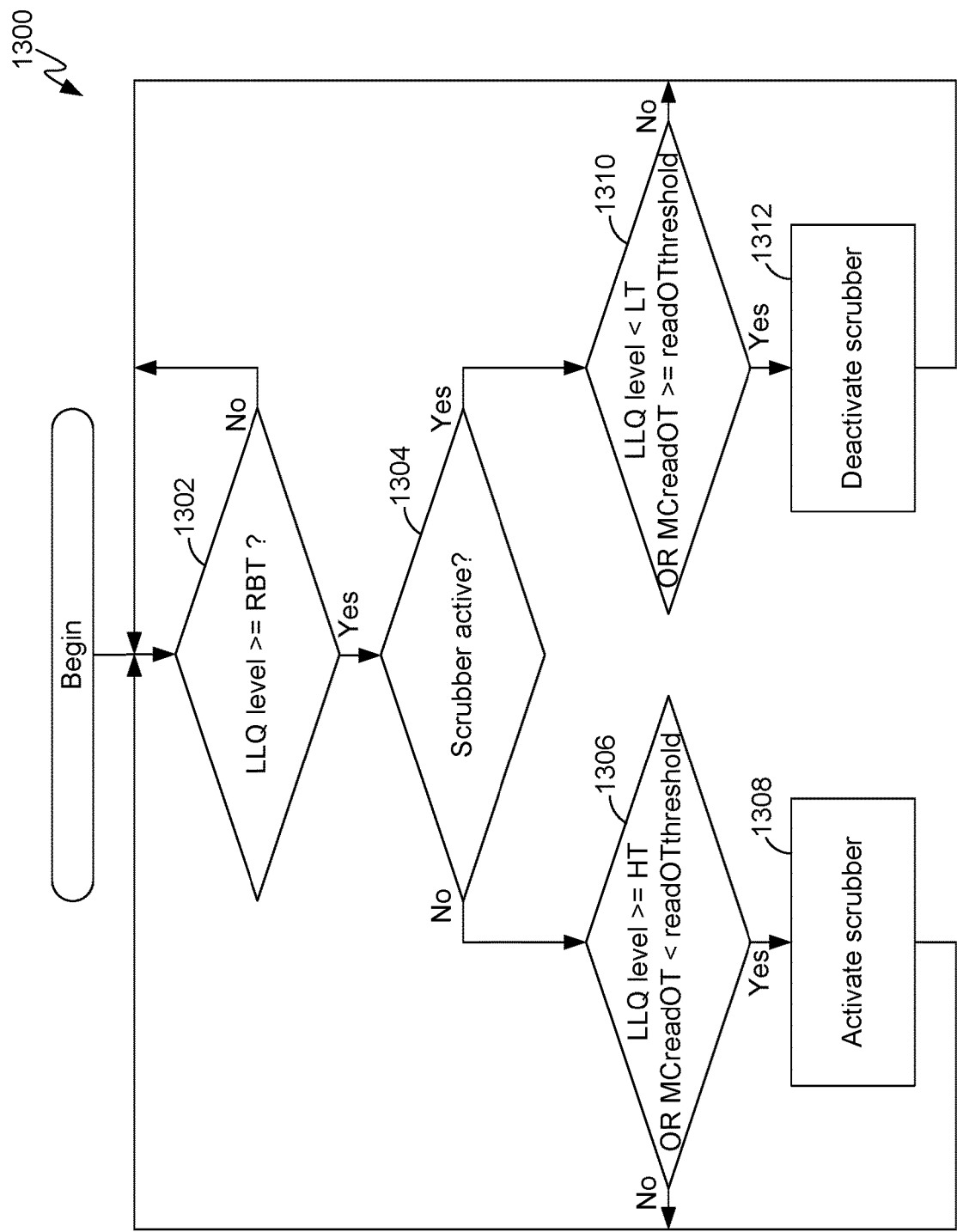
FIG. 13 is a flow diagram of a method for activating and deactivating the eviction of cached data to maintain cache dirtiness within a window, using the linked list queues, in accordance with exemplary embodiments.

Although initializations are not shown in FIG. 13 or other flow diagrams herein for purposes of clarity, the scrubber 302 (FIG. 3) may be initialized to an inactive state. As indicated by block 1302, it may be determined whether the LLQ level is greater than or equal to a predetermined minimum threshold (i.e., a "rock bottom threshold" or RBT). The minimum threshold may be determined empirically. For example, it may be determined statistically that if the pool of candidate cache lines for eviction in a rank is maintained above 80 candidates, the result is, with a high probability, a bank spread of about 16. The determination indicated by block 1302 may repeat until it may be determined that the LLQ level is greater than or equal to the minimum threshold. If it is determined that the LLQ level is greater than or equal to the minimum threshold, then it may be determined whether the scrubber is active, as indicated by block 1304. If it is determined that the scrubber is not active, then it may be determined whether the LLQ level is greater than or equal to the high threshold or the number of read requests pending in the memory controller (MCreadOT) is less than a predetermined or fixed threshold (readOTthreshold), as indicated by block 1306. If it is determined that the LLQ level is greater than or equal to the high threshold or the number of read requests pending in the memory controller (MCreadOT) is less than the predetermined or fixed threshold (readOTthreshold), then the scrubber may be activated or enabled, as indicated by block 1308. The method 1300 may then return to above-described block 1302. If it is determined that the LLQ level is not greater than or equal to the high threshold and the number of read requests pending in the memory controller (MCreadOT) is not less than the predetermined fixed threshold (readOTthreshold), then the method 1300 may return to above-described block 1302.

If it is determined (block 1304) that the scrubber is active, then it may be determined whether the LLQ level is less than the low threshold or the number of read requests pending in the memory controller (MCreadOT) is greater than or equal to the predetermined fixed threshold, as indicated by block 1310. If it is determined that the LLQ level is less than the low threshold or the number of read requests pending in the memory controller (MCreadOT) is greater than or equal to the predetermined or fixed threshold (readOTthreshold), then the scrubber may be deactivated or disabled, as indicated by block 1312. The method 1300 may then return to above-described block 1302. If it is determined that the LLQ level is not less than the low threshold and the number of read requests pending in the memory controller (MCreadOT) is not greater than or equal to the predetermined or fixed threshold (readOTthreshold), then the method 1300 may return to above-described block 1302.

The above-described methods 500 (FIG. 5), 800 (FIG. 8), 900 (FIGS. 9A-9B), 1000 (FIG. 10), 1100 (FIG. 11) and 1200 (FIG. 12), relating to processing write requests, may be referred to as "DRAM-aware" because they leverage the latency-reducing organization of the DRAM. Similar methods may be provided for DRAM-aware processing of other types of memory transactions. For example, for processing read prefetch requests, instead of storing information identifying cache locations of dirty data in selected LLQs or other data storage structures as described above with regard to, for example, the method 500, read prefetch requests may be stored. And instead of evicting cache lines identified by the contents stored in the selected LLQs or other data storage structures in a DRAM-aware order as described above with regard to, for example, the method 500, the prefetch requests may be sent from the LLQs or other data storage structures to the DRAM (via a memory controller) in such a DRAM-aware order.

Figure 14:
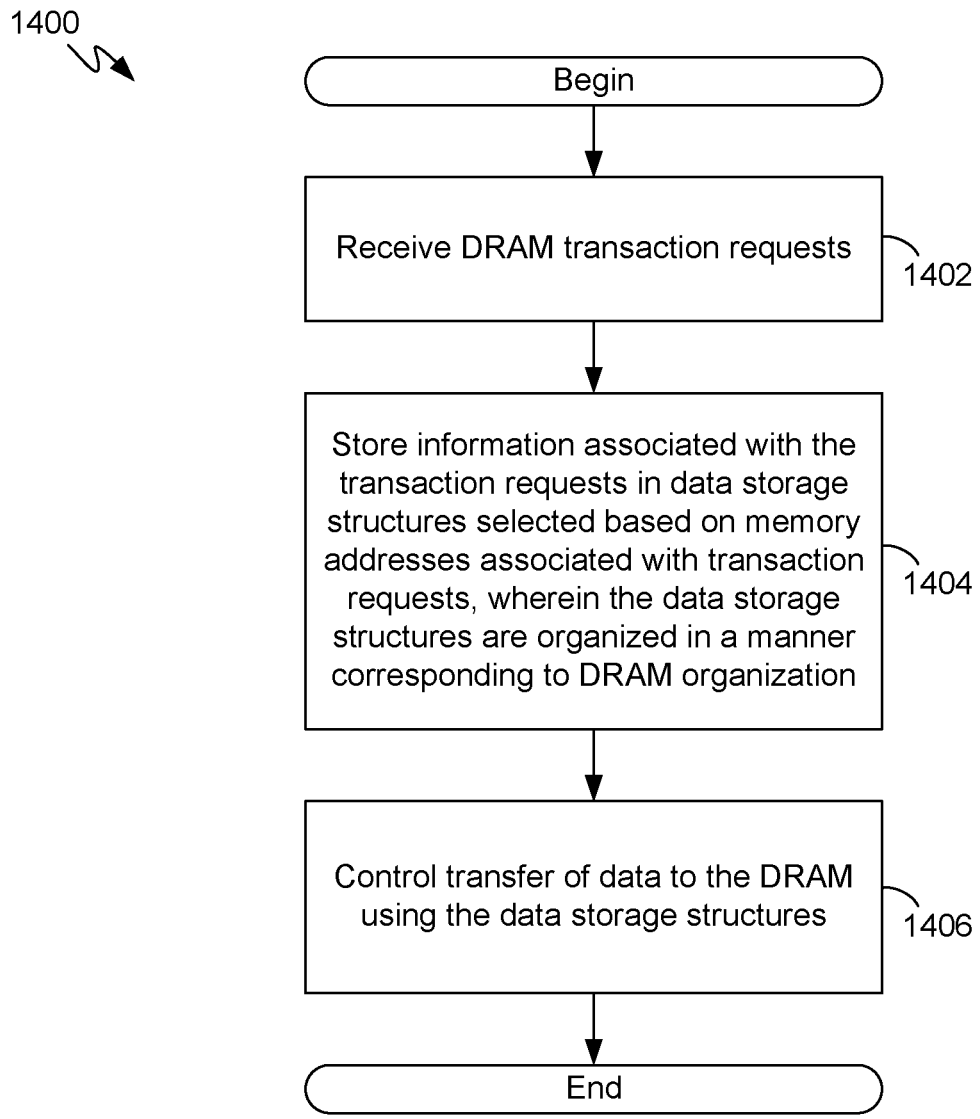
FIG. 14 is a flow diagram of a method for controlling aspects of data caching associated with DRAM transaction requests, in accordance with exemplary embodiments.

As illustrated in FIG. 14, a method 1400 for controlling data caching is depicted in flow diagram form. As indicated by block 1402, the method 1400 may include receiving DRAM transaction requests. As indicated by block 1404, the method may further include storing information associated with the transaction requests in data storage structures that are organized in a manner corresponding to the DRAM organization. As indicated by block 1406, the method 1400 may also include controlling transfer of data to the DRAM using the data storage structures.

Figure 15:
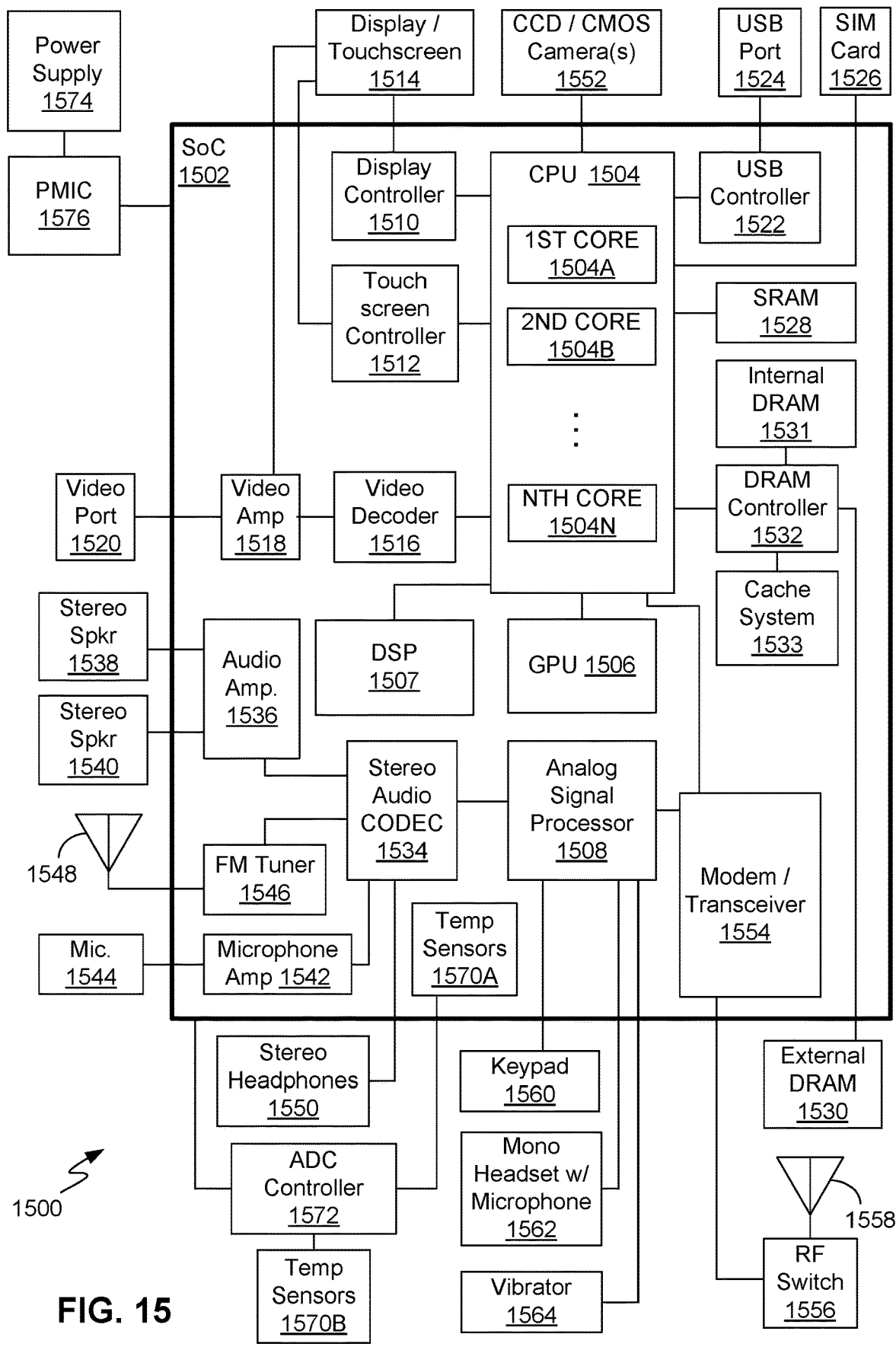
FIG. 15 is a block diagram of a portable computing device or PCD, in accordance with exemplary embodiments.

As illustrated in FIG. 15, exemplary embodiments of systems and methods for controlling data caching in a DRAM-aware manner may be provided in a portable computing device ("PCD") 1500. For purposes of clarity, data buses or other data communication interconnects are not shown in FIG. 15. Some exemplary interconnections, some of which may represent communication via such buses or interconnects, are described for context. Nevertheless, it should be understood that, more generally, various elements described below may communicate with each other via one or more buses or system interconnects.

The PCD 1500 may include an SoC 1502. The SoC 1502 may include a CPU 1504, a GPU 1506, a DSP 1507, an analog signal processor 1508, or other processors. The CPU 1504 may include multiple cores, such as a first core 1504A, a second core 1504B, etc., through an Nth core 1504N.

A display controller 1510 and a touch-screen controller 1512 may be coupled to the CPU 1504. A touchscreen display 1514 external to the SoC 1502 may be coupled to the display controller 1510 and the touch-screen controller 1512. The PCD 1500 may further include a video decoder 1516 coupled to the CPU 1504. A video amplifier 1518 may be coupled to the video decoder 1516 and the touchscreen display 1514. A video port 1520 may be coupled to the video amplifier 1518. A universal serial bus ("USB") controller 1522 may also be coupled to CPU 1504, and a USB port 1524 may be coupled to the USB controller 1522. A subscriber identity module ("SIM") card 1526 may also be coupled to the CPU 1504.

One or more memories may be coupled to the CPU 1504. The one or more memories may include both volatile and non-volatile memories. Examples of volatile memories include static random access memory ("SRAM") 1528 and dynamic RAMs ("DRAM"s) 1530 and 1531. Such memories may be external to the SoC 1502, such as the DRAM 1530, or internal to the SoC 1502, such as the DRAM 1531. A DRAM controller 1532 coupled to the CPU 1504 may control the writing of data to, and reading of data from, the DRAMs 1530 and 1531. In other embodiments, such a DRAM controller may be included within a processor, such as the CPU 1504. The DRAMs 1530 and 1531 may be examples of the DRAM 208 (FIG. 2) or, more generally, any of the DRAMs referenced above with regard to FIGS. 1-14. A cache system 1533, which may be an example of the cache system 204 (FIG. 2), may be coupled to the DRAM controller 1532.

A stereo audio CODEC 1534 may be coupled to the analog signal processor 1508. Further, an audio amplifier 1536 may be coupled to the stereo audio CODEC 1534. First and second stereo speakers 1538 and 1540, respectively, may be coupled to the audio amplifier 1536. In addition, a microphone amplifier 1542 may be coupled to the stereo audio CODEC 1534, and a microphone 1544 may be coupled to the microphone amplifier 1542. A frequency modulation ("FM") radio tuner 1546 may be coupled to the stereo audio CODEC 1534. An FM antenna 1548 may be coupled to the FM radio tuner 1546. Further, stereo headphones 1550 may be coupled to the stereo audio CODEC 1534. Other devices that may be coupled to the CPU 1504 include one or more digital (e.g., CCD or CMOS) cameras 1552.

A modem or RF transceiver 1554 may be coupled to the analog signal processor 1508 and the CPU 1504. An RF switch 1556 may be coupled to the RF transceiver 1554 and an RF antenna 1558. In addition, a keypad 1560, a mono headset with a microphone 1562, and a vibrator device 1564 may be coupled to the analog signal processor 1508.

The SoC 1502 may have one or more internal or on-chip thermal sensors 1570A and may be coupled to one or more external or off-chip thermal sensors 1570B. An analog-to-digital converter ("ADC") controller 1572 may convert voltage drops produced by the thermal sensors 1570A and 1570B to digital signals. A power supply 1574 and a power management integrated circuit ("PMIC") 1576 may supply power to the SoC 1502.

Firmware or software may be stored in any of the above-described memories, such as DRAM 1530 or 1531, SRAM 1528, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Alternative embodiments will become apparent to one of ordinary skill in the art to which the invention pertains. Therefore, although selected aspects have been illustrated and described in detail, it will be understood that various substitutions and alterations may be made therein.

Implementation examples are described in the following numbered clauses:

1. A system for controlling data caching, comprising:
   a plurality of data storage structures collectively having an organization corresponding to a structural organization of a dynamic random access memory (DRAM); and
   a cache controller system configured to:
   receive a plurality of transaction requests;
   store data associated with the transaction requests in one or more data storage structures selected from among the plurality of data storage structures based on a memory address associated with each transaction request; and
   control data transfer to the DRAM using the plurality of data storage structures.

2. The system of clause 1, wherein each of the plurality of data storage structures is a linked list.

3. The system of clause 1, wherein each of the plurality of data storage structures corresponds to one of a plurality of banks of the DRAM.

4. The system of clause 3, wherein the cache controller system is configured to:
   receive a plurality of DRAM write requests having associated memory addresses; and
   store cache address information associated with the plurality of DRAM write requests in corresponding selected data storage structures selected based on bank addresses associated with the DRAM write requests.

5. The system of clause 4, wherein the cache controller system is configured to control data transfer to the DRAM by being configured to:
   select among the plurality of data storage structures; and
   evict to the DRAM cached data from locations in the data cache indicated by the data stored in the selected data storage structures.

6. The system of clause 5, wherein the cache controller system is configured to select among the plurality of data storage structures based on a sequence.

7. The system of clause 6, wherein the sequence is based on a round-robin selection.

8. The system of clause 7, wherein the sequence is further based on DRAM page hit information stored in the data storage structures.

9. The system of clause 5, wherein the cache controller system is configured to select between a first subset of the plurality of data storage structures associated with a first rank of the DRAM and a second subset of the plurality of data storage structures associated with a second rank of the DRAM.

10. The system of clause 5, wherein cache controller system is configured to selectively enable eviction of cached data based on at least one threshold level of cache dirtiness.

11. A method for controlling data caching, comprising:
    receiving a plurality of transaction requests;
    storing data associated with the transaction requests in one or more data storage structures selected from among the plurality of data storage structures based on a memory address associated with each transaction request; and
    controlling data transfer to a dynamic random access memory (DRAM) using the plurality of data storage structures, wherein plurality of data storage structures collectively having an organization corresponding to a structural organization of the DRAM.

12. The method of clause 11, wherein storing data associated with the transaction requests comprises storing the data associated with the transaction requests in a plurality of linked lists.

13. The method of clause 11, wherein each of the plurality of data storage structures corresponds to one of a plurality of banks of the DRAM.

14. The method of clause 13, wherein:
    receiving a plurality of transaction requests comprises receiving a plurality of DRAM write requests having associated memory addresses; and
    storing data associated with the transaction requests comprises storing cache address information associated with the plurality of DRAM write requests in corresponding selected data storage structures selected based on bank addresses associated with the DRAM write requests.

15. The method of clause 14, wherein controlling data transfer to the DRAM comprises:
    selecting among the plurality of data storage structures; and
    evicting to the DRAM cached data from locations in the data cache indicated by the data stored in the selected data storage structures.

16. The method of clause 15, wherein selecting among the plurality of data storage structures is based on a sequence.

17. The method of clause 16, wherein the sequence is based on a round-robin selection.

18. The method of clause 17, wherein the sequence is further based on DRAM page hit information stored in the data storage structures.

19. The method of clause 15, wherein selecting among the plurality of data storage structures comprises selecting between a first subset of the plurality of data storage structures associated with a first rank of the DRAM and a second subset of the plurality of data storage structures associated with a second rank of the DRAM.

20. The method of clause 15, wherein controlling data transfer to the DRAM comprises selectively enabling eviction of cached data based on at least one threshold level of cache dirtiness.

21. A system for controlling data caching, comprising:
    means for receiving a plurality of transaction requests;
    means for storing data associated with the transaction requests in one or more data storage structures selected from among the plurality of data storage structures based on a memory address associated with each transaction request; and means for controlling data transfer to a dynamic random access memory (DRAM) using the plurality of data storage structures, wherein plurality of data storage structures collectively having an organization corresponding to a structural organization of the DRAM.

22. The system of clause 21, wherein the means for storing data associated with the transaction requests comprises means for storing the data associated with the transaction requests in a plurality of linked lists.

23. The system of clause 21, wherein each of the plurality of data storage structures corresponds to one of a plurality of banks of the DRAM.

24. The system of clause 23, wherein:
the means for receiving a plurality of transaction requests comprises means for receiving a plurality of DRAM write requests having associated memory addresses; and
the means for storing data associated with the transaction requests comprises means for storing cache address information associated with the plurality of DRAM write requests in corresponding selected data storage structures selected based on bank addresses associated with the DRAM write requests.

25. The system of clause 24, wherein the means for controlling data transfer to the DRAM comprises:
means for selecting among the plurality of data storage structures; and
means for evicting to the DRAM cached data from locations in the data cache indicated by the data stored in the selected data storage structures.

26. The system of clause 25, wherein the means for selecting among the plurality of data storage structures is based on a sequence.

27. The system of clause 26, wherein the sequence is based on a round-robin selection.

28. The system of clause 27, wherein the sequence is further based on DRAM page hit information stored in the data storage structures.

29. The system of clause 25, wherein the means for selecting among the plurality of data storage structures comprises means for selecting between a first subset of the plurality of data storage structures associated with a first rank of the DRAM and a second subset of the plurality of data storage structures associated with a second rank of the DRAM.

30. The system of clause 25, wherein the means for controlling data transfer to the DRAM comprises means for selectively enabling eviction of cached data based on at least one threshold level of cache dirtiness.

31. A computer-readable medium for controlling data caching, comprising a non-transitory computer-readable medium having stored thereon in computer-executable form instructions that, when executed by a processor, configure the processor to:
receive a plurality of transaction requests;
store data associated with the transaction requests in one or more data storage structures selected from among the plurality of data storage structures based on a memory address associated with each transaction request; and
control data transfer to a dynamic random access memory (DRAM) using the plurality of data storage structures, each of the plurality of data storage structures corresponding to one of a plurality of banks of the DRAM.

32. The computer-readable medium of clause 31, wherein the processor is configured to store data associated with the transaction requests by being configured to store the data associated with the transaction requests in a plurality of linked lists.

What is claimed is:

1. A system for controlling data caching, comprising:
a plurality of data storage structures collectively having an organization corresponding to a structural organization of a dynamic random access memory (DRAM), wherein each of the plurality of data storage structures is a linked list queue organized in a manner corresponding to a rank, bank group, and bank organization of the DRAM; and each linked list queue corresponds to one of a plurality of banks of the DRAM; and
a cache controller system configured to:
receive a plurality of transaction requests;
store data associated with the transaction requests in one or more of the data storage structures selected from among the plurality of data storage structures based on a memory address associated with each transaction request;
control data transfer to the DRAM using the plurality of data storage structures;
select among the plurality of data storage structures according to a sequence, wherein the sequence is based on at least one of a round-robin selection and DRAM page hit information stored in the data storage structures; and
evict to the DRAM cached data from locations in the data cache indicated by the data stored in the selected data storage structures.

2. The system of claim 1, wherein each linked list queue has a data field for a rank, a data field for a bank group, and a data field for a bank corresponding to the DRAM.

3. The system of claim 1, wherein the linked list queues are organized by subsets, wherein each subset corresponds to one rank of the DRAM.

4. The system of claim 1, wherein the cache controller system is configured to:
receive a plurality of DRAM write requests having associated memory addresses; and
store cache address information associated with the plurality of DRAM write requests in corresponding selected data storage structures selected based on bank addresses associated with the DRAM write requests.

5. The system of claim 1, wherein the cache controller system is configured to select between a first subset of the plurality of data storage structures associated with a first rank of the DRAM and a second subset of the plurality of data storage structures associated with a second rank of the DRAM.

6. The system of claim 1, wherein cache controller system is configured to selectively enable eviction of cached data based on at least one threshold level of cache dirtiness.

7. A method for controlling data caching, comprising:
receiving a plurality of transaction requests;
storing data associated with the transaction requests in one or more data storage structures selected from among the plurality of data storage structures based on a memory address associated with each transaction request;
controlling data transfer to a dynamic random access memory (DRAM) using the plurality of data storage structures, wherein plurality of data storage structures collectively having an organization corresponding to a structural organization of the DRAM, wherein each of the plurality of data storage structures is a linked list queue organized in a manner corresponding to a rank, bank group, and bank organization of the DRAM; and each linked list queue corresponds to one of a plurality of banks of the DRAM;

selecting among the plurality of data storage structures according to a sequence, wherein the sequence is based on at least one of a round-robin selection and DRAM page hit information stored in the data storage structures; and evicting to the DRAM cached data from locations in the data cache indicated by the data stored in the selected data storage structures.

8. The method of claim 7, wherein each linked list queue has a data field for a rank, a data field for a bank group, and a data field for a bank corresponding to the DRAM.

9. The method of claim 7, wherein the linked list queues are organized by subsets, wherein each subset corresponds to one rank of the DRAM.

10. The method of claim 7, wherein:

receiving a plurality of transaction requests comprises receiving a plurality of DRAM write requests having associated memory addresses; and storing data associated with the transaction requests comprises storing cache address information associated with the plurality of DRAM write requests in corresponding selected data storage structures selected based on bank addresses associated with the DRAM write requests.

11. The method of claim 7, wherein selecting among the plurality of data storage structures comprises selecting between a first subset of the plurality of data storage structures associated with a first rank of the DRAM and a second subset of the plurality of data storage structures associated with a second rank of the DRAM.

12. The method of claim 7, wherein controlling data transfer to the DRAM comprises selectively enabling eviction of cached data based on at least one threshold level of cache dirtiness.

13. A system for controlling data caching, comprising:

means for receiving a plurality of transaction requests;

means for storing data associated with the transaction requests in one or more data storage structures selected from among the plurality of data storage structures based on a memory address associated with each transaction request;

means for controlling data transfer to a dynamic random access memory (DRAM) using the plurality of data storage structures, wherein plurality of data storage structures collectively having an organization corresponding to a structural organization of the DRAM, each of the plurality of data storage structures is a linked list queue organized in a manner corresponding to a rank, bank group, and bank organization of the DRAM; and each linked list queue corresponds to one of a plurality of banks of the DRAM;

means for selecting among the plurality of data storage structures according to a sequence, wherein the sequence is based on at least one of a round-robin selection and DRAM page hit information stored in the data storage structures; and means for evicting to the DRAM cached data from locations in the data cache indicated by the data stored in the selected data storage structures.

14. The system of claim 13, wherein each linked list queue has a data field for a rank, a data field for a bank group, and a data field for a bank corresponding to the DRAM.

15. The system of claim 13, wherein the linked list queues are organized by subsets, wherein each subset corresponds to one rank of the DRAM.

16. The system of claim 13, wherein:

the means for receiving a plurality of transaction requests comprises means for receiving a plurality of DRAM write requests having associated memory addresses; and the means for storing data associated with the transaction requests comprises means for storing cache address information associated with the plurality of DRAM write requests in corresponding selected data storage structures selected based on bank addresses associated with the DRAM write requests.

17. The system of claim 13, wherein the means for selecting among the plurality of data storage structures comprises means for selecting between a first subset of the plurality of data storage structures associated with a first rank of the DRAM and a second subset of the plurality of data storage structures associated with a second rank of the DRAM.

18. The system of claim 13, wherein the means for controlling data transfer to the DRAM comprises means for selectively enabling eviction of cached data based on at least one threshold level of cache dirtiness.

19. A computer-readable medium for controlling data caching, comprising a non-transitory computer-readable medium having stored thereon in computer-executable form instructions that, when executed by a processor, configure the processor to:

receive a plurality of transaction requests;

store data associated with the transaction requests in one or more data storage structures selected from among the plurality of data storage structures based on a memory address associated with each transaction request;

control data transfer to a dynamic random access memory (DRAM) using the plurality of data storage structures, each of the plurality of data storage structures corresponding to one of a plurality of banks of the DRAM, wherein each of the plurality of data storage structures is a linked list queue organized in a manner corresponding to a rank, bank group, and bank organization of the DRAM; and each linked list queue corresponds to one of a plurality of banks of the DRAM;

select among the plurality of data storage structures according to a sequence, wherein the sequence is based on at least one of a round-robin selection and DRAM page hit information stored in the data storage structures; and evict to the DRAM cached data from locations in the data cache indicated by the data stored in the selected data storage structures.

20. The computer-readable medium of claim 19, wherein each linked list queue has a data field for a rank, a data field for a bank group, and a data field for a bank corresponding to the DRAM.

21. The computer-readable medium of claim 19, wherein processor is further configured to:

receive a plurality of DRAM write requests having associated memory addresses; and store cache address information associated with the plurality of DRAM write requests in corresponding selected data storage structures selected based on bank addresses associated with the DRAM write requests.

22. The computer-readable medium of claim 19, wherein processor is further configured to:

select between a first subset of the plurality of data storage structures associated with a first rank of the DRAM and a second subset of the plurality of data storage structures associated with a second rank of the DRAM.

23. The computer-readable medium of claim 19, wherein processor is further configured to:

selectively enable eviction of cached data based on at least one threshold level of cache dirtiness.

\* \* \* \* \*